(12) United States Patent
Moromizato

(10) Patent No.: US 7,630,217 B2
(45) Date of Patent: Dec. 8, 2009

(54) SYNCHRONOUS RECTIFICATION FORWARD CONVERTER

(75) Inventor: Eito Moromizato, Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/763,895

(22) Filed: Jun. 15, 2007

(65) Prior Publication Data

US 2007/0242486 A1    Oct. 18, 2007

Related U.S. Application Data

(63) Continuation of application No. PCT/JP2006/317623, filed on Sep. 6, 2006.

(30) Foreign Application Priority Data

Sep. 15, 2005   (JP)   ............................. 2005-269000

(51) Int. Cl.
   *H02M 3/335*   (2006.01)
(52) U.S. Cl. .............. 363/21.06; 363/21.04; 363/21.08
(58) Field of Classification Search .................. 363/20, 363/21.01, 21.04, 21.06, 21.08, 21.14
   See application file for complete search history.

(56) References Cited

U.S. PATENT DOCUMENTS

| | | | | |
|---|---|---|---|---|
| 6,061,255 | A * | 5/2000 | Chik et al. | 363/21.06 |
| 6,295,214 | B1 * | 9/2001 | Matsumoto et al. | 363/21.01 |
| 6,351,396 | B1 * | 2/2002 | Jacobs | 363/21.06 |
| 6,760,235 | B2 * | 7/2004 | Lin et al. | 363/21.06 |
| 7,042,739 | B2 * | 5/2006 | Nagai et al. | 363/21.06 |
| 7,203,041 | B2 * | 4/2007 | Williams et al. | 361/20 |

2005/0041441 A1    2/2005   Nagai et al.

FOREIGN PATENT DOCUMENTS

| | | |
|---|---|---|
| JP | 10-146051 | 5/1998 |
| JP | 2002-238253 | 8/2002 |
| JP | 2003-304684 | 10/2003 |
| JP | 2004-208444 | 7/2004 |
| JP | 2005-080342 | 3/2005 |

OTHER PUBLICATIONS

Chinese Office Action issued May 9, 2008 in connection with Chinese Application No. 200680001068.5 with Japanese and English Language translations.
Written Opinion International Search Report issued Dec. 5, 2006.

* cited by examiner

*Primary Examiner*—Matthew V Nguyen
(74) *Attorney, Agent, or Firm*—Ostrolenk Faber LLP

(57)   ABSTRACT

A rectification switch control switch element (Q7) is provided between a gate and a source of a rectification switch element (Q2). The rectification switch control switch element (Q7) is turned ON in response to a signal on a secondary side of a pulse transformer (T2) at a turn OFF timing of a main switch element (Q1) to forcedly turn OFF the rectification switch element (Q2). As a result, the rectification switch element (Q2) can be turned OFF in synchronism with an OFF of the main switch element at a time of a backflow. With use of a free resonance between a capacitance between a gate and a source of the rectification switch element (Q2) and a commutation switch element (Q3) and a choke coil (L2), an excitation state of the choke coil (L2) can be reset. Then, it is possible to stabilize a detection voltage of a tertiary rectification smoothing circuit (22) which uses a tertiary winding (N13) of a transformer (T1), thus stabilizing control of the circuit functions.

10 Claims, 15 Drawing Sheets

PRIOR ART

SYNCHRONOUS RECTIFICATION FORWARD CONVERTER

CROSS-REFERENCE TO RELATED APPLICATION

This is a 35 U.S.C. §120 continuation of PCT/JP2006/317623 filed Sep. 6, 2006, which claims priority of JP2005-269000 filed Sep. 15, 2005, both incorporated by reference.

BACKGROUND OF THE INVENTION

1. Technical Field

The present invention relates to a forward converter for performing a synchronous rectification on an output current.

2. Background Art

Japanese Unexamined Patent Application Publication No. 2004-208444 discloses a conventional synchronous rectification forward converter. FIG. 1 illustrates a circuit of the converter of Japanese Unexamined Patent Application Publication No. 2004-208444.

In the synchronous rectification forward converter circuit illustrated in FIG. 1, a main switch element 1 is connected in series to a primary coil 131 of a transformer 130, and an output voltage of a secondary coil 132 of the transformer 130 which is supplied to a load 143 is controlled to be a constant voltage in accordance with an ON-OFF drive of the main switch element 1. This converter includes a switch element 150 which is connected in series with a tertiary coil 133 of the transformer 130. The converter also includes a switch element driver circuit 121 for performing an ON-OFF control for the main switch element 1 on the basis of a detection voltage of an output voltage detection circuit 119 including the switch element 150 that detects an output voltage from an induced voltage of the tertiary coil 133.

With the conventional synchronous rectification forward converter illustrated in FIG. 1, when an excess voltage is applied from the output side (backflow), an excitation of the secondary side choke coil 4 of the transformer 130 increases. An ON period of the transformer is accordingly set longer. With the transformer winding driver type circuit illustrated in FIG. 1, the ON period of the transformer is abnormally increased. Thus, self-oscillation may be caused by the choke coil 4 on the output side in response to the above-mentioned backflow. As a result, the control of the primary side switch element driver circuit 121 becomes unstable in some cases.

In addition, because of the above-mentioned increase in the ON period of the transformer, the excitation of the choke coil 4 cannot be reset in one cycle of a switching frequency in some cases. In that case, the ON period of the transformer may be extended beyond the control range of the switch element driver circuit 121, so that the excitation state of the transformer 130 cannot be reset. Thus, an excess drain voltage may be generated for the main switch element 1. This may cause a stress on the main switch element 1, which leads to additional problems.

SUMMARY OF THE INVENTION

In view of the above, it would be desirable to solve the above-mentioned and other problems and to provide a synchronous rectification forward converter with a stabilized primary side switching control even at a time of backflow due to an excess output voltage, which may cause self-oscillation, and which provides for resetting a transformer to prevent a stress on a main switch element.

The invention solves the above-mentioned and other problems by providing synchronous rectification forward converters according to advantageous aspects of the present invention, illustrated by but not limited to the following configurations.

1. A synchronous rectification forward converter may include: a transformer (T1) provided with a primary winding (N11), a secondary winding (N12), and a tertiary winding (N13); a main switch element (Q1) connected in series to the primary winding (N11) of the transformer (T1); a choke coil (L2) connected in series to the secondary winding (N12) of the transformer (T1); a smoothing capacitor (C1) connected in parallel to output terminals; a rectification switch element (Q2) connected in series to the secondary winding (N12) of the transformer (T1), for being turned ON and OFF in synchronism with ON and OFF of the main switch element (Q1); a commutation switch element (Q3) for being turned OFF in synchronism with ON of the main switch element (Q1) and for forming a discharge path for an excitation energy of the choke coil in synchronism with OFF of the main switch element (Q1); an output voltage detection circuit (22) for indirectly detecting an output voltage between the output terminals with use of an induced voltage of the tertiary winding (N13) of the transformer (T1); a switching control circuit (23) for controlling a switching of the main switch element (Q1); a rectification switch control switch element (Q7) for forcedly turning OFF the rectification switch by controlling a voltage of the control terminal of the rectification switch element (Q2); and a rectification switch element driver circuit (29 or half part of 24) for controlling the rectification switch control switch element (Q7) at a timing when the main switch element (Q1) is turned OFF in accordance with the control of the switching control circuit (23).

2. The synchronous rectification forward converter may further include a commutation switch element driver circuit (28 or half part of 24) for forcedly turning OFF the commutation switch element (Q3) in accordance with the control of the switching control circuit (23) at a timing when the main switch element (Q1) is turned ON by controlling the voltage of the control terminal of the commutation switch element (Q3).

3. The commutation switch element driver circuit (half part of 24) may be operated by using a voltage generated in one of the windings of the transformer as an AC voltage supply.

4. The synchronous rectification forward converter may further include: a switch element (Q8) connected in series to the drive current supply path of the rectification switch element (Q2); and a switch element control circuit (31) for turning ON and OFF the switch element (Q8) in synchronism with ON and OFF of the main switch element (Q1).

5. The synchronous rectification forward converter may further include, on a secondary side of a pulse transformer (T2) for transmitting ON and OFF signals of the main switch element (Q1), a diode bridge for rectifying said ON and OFF signals of the main switch element (Q1) and for placing an OFF timing of the rectification switch element (Q2) and an OFF timing of the commutation switch element (Q3) on a same signal line for transmission.

6. The synchronous rectification forward converter may further include, on a primary side of a pulse transformer (T2) for transmitting ON and OFF signals of the main switch element (Q1), a diode bridge for generating ON and OFF signal of the main switch element (Q1) in a same direction between the primary side and the secondary side of the pulse transformer (T2).

7. The synchronous rectification forward converter may further include a delay circuit (33) connected to the pulse transformer (T2) for transmitting the ON and OFF signals of the main switch element (Q1) from the control signal path to the main switch element (Q1) and for setting a delay time for a rise of the ON and OFF signals and the ON control signal of the main switch element (Q1).

8. The synchronous rectification forward converter may further include: first and optionally second commutation switch turn OFF control switch elements (Q5 and optionally Q9) connected in series to an auxiliary winding (N14) of the transformer (T1), for controlling an application of the electromotive voltage of the auxiliary winding (N14) of the transformer (T1) with respect to the control terminal of the commutation switch element (Q3); a control switch element driver circuit (24) for turning ON the first commutation switch turn OFF control switch element (Q5) when the main switch element (Q1) is ON; and a primary side control stop detection circuit (25) for detecting a control stop state of the switching control circuit (23) and for turning ON the second commutation switch turn OFF control switch element (Q9) in which the first commutation switch turn OFF control switch element (Q5) controls an OFF timing of the commutation switch element (Q3) and the second commutation switch turn OFF control switch element (Q9) controls an ON timing of the commutation switch element (Q3) when the switching of the main switch element (Q1) is stopped.

9. The synchronous rectification forward converter may further include: a rectification switch turn ON control switch element (Q8) connected in series to an ON drive electric power supply path for a control signal from one terminal of the secondary winding (N12) of the transformer (T1) to the control terminal of the rectification switch element (Q2); and a primary side control stop detection circuit (25) for detecting a control stop state of the switching control circuit (23) and for turning OFF the rectification switch turn ON control switch element (Q8); in which when the switching of the main switch element (Q1) is stopped, an ON period of the rectification switch element (Q2) is limited to stop a synchronous rectification of the rectification switch element (Q2).

The foregoing configurations have several advantageous features, including the following:

1. At a time when the main switch element Q1 is turned OFF in accordance with the control of the switching control circuit 23, the rectification switch element Q2 is forcedly turned OFF. Thus, in a case where a voltage equal to or larger than a normal voltage is generated at the secondary side output of the transformer (upon the backflow), at a point in time when the rectification switch element Q2 is forcedly turned OFF, such a state is established that the rectification switch element Q2 and the commutation switch element Q3 are concurrently turned OFF. Accordingly, a free resonance is generated between a choke coil L2 and the rectification switch element Q2. Due to this free resonance, the choke coil L2 is reset. As a result, the induced voltage of the tertiary winding N13 of the transformer T1 is stabilized. Then, the control for the output voltage between the output terminals is stabilized. Also, the excitation period of the transformer T1 is not increased. Therefore, no adverse effect is imparted on the circuit by the induced voltages of the respective windings of the transformer T1.

2. With use of the commutation switch element driver circuit, when the forced turn OFF of the commutation switch element Q3 is performed at the timing of the turn OFF of the main switch element Q1, the commutation switch element Q3 is turned ON at the same time as the inversion of the transformer voltage. Thus, a loss due to short circuitry of the secondary winding N12 of the transformer can be suppressed.

3. The commutation switch element driver circuit is configured to operate with use of a voltage generated in any one of the windings of the transformer T1 as the AC voltage source. The following sequence occurs: the turn OFF of the main switch element Q1→the generation of delay time at the time of the backflow operation (which is not generated at the time of the normal operation)→the generation of the flyback voltage of the transformer→the turn ON of the commutation switch element Q3. Due to this delay, from the turning OFF of the main switch element Q1 to the turning ON of the commutation switch element Q3, it is unnecessary to provide a special delay circuit.

4. The switch element Q8 that is provided to the drive current supply path of the rectification switch element Q2 in series is turned ON and OFF in synchronism with the turn ON and OFF of the main switch element Q1 by the control circuit 31. Upon the discharge of the capacitance between the drain and the source of the rectification switch element Q2, even with the switch element Q7 causing a short circuit between the gate and the source of Q2, there is a charging current from the secondary winding N12 of the transformer T1. Thus, it is impossible to perform a quick discharge. However, while the switch element Q8 is provided to the drive current supply path of the rectification switch element Q2 in series in this manner, the drive current supply path of the rectification switch element Q2 is interrupted with use of the switch element Q8. Thus, it is possible to turn OFF the rectification switch element Q2 completely. Then, the resonance voltage is generated at the gate of the rectification switch element Q2 at the time of concurrent turn off of the rectification switch element Q2 and the commutation switch element Q3. This tends to cause the rectification switch element Q2 to be turned ON again. However, the above-mentioned switch element Q8 in the OFF state interrupts the drive current supply path of the rectification switch element Q2. Therefore, the rectification switch element Q2 is not turned ON again, thereby improving the backflow prevention characteristic.

5. The ON and OFF signals for the main switch element Q1 are rectified with use of the diode bridge on the secondary side of the pulse transformer T2, and the OFF timing for the rectification switch element Q2 and that for the commutation switch element Q3 are put on the same signal line to be transmitted between the primary and the secondary of the pulse transformer T2. Therefore, it is possible to control the rectification switch element Q2 and the commutation switch element Q3 with use of the single pulse transformer.

6. With the provision of the diode bridge for generating the ON-OFF timing signal for the main switch element Q1 on the primary side of the pulse transformer T2 for transmitting the ON-OFF timing signal for the main switch element Q1 in the same direction between the primary and the secondary of the pulse transformer T2, as in a case where the diode bridge is provided on the secondary side of the pulse transformer, on the basis of the switch characteristic (such as the use of the bipolar transistor), there is no fear of the malfunction at the ON timing of the switch that is to be synchronized with the OFF timing caused by the noise due to the free resonance of the pulse transformer. Then, by generating the signal voltage in the same direction, it is unnecessary to provide a circuit for signal inversion.

7. With use of the delay circuit 33, the pulse transformer T2 for transmitting the ON and OFF signals for the main switch element Q1 is separated from the control signal path for the main switch element Q1 and the delay time is set between the rise of the above-mentioned ON and OFF signals and that of the ON control signal for the main switch element Q1. Thus, as compared with the case where the control for the rectification switch element Q2 and that for the commutation switch element Q3 are performed with use of the pulse transformer, a loss due to the concurrent ON of the rectification switch element Q2 and the commutation switch element Q3 can be prevented with a higher reliability.

8. With the provision of the first and second commutation switch turn OFF control switch elements Q5 and Q9, which are connected in series to the auxiliary winding N14 of the transformer T1 with respect to the control terminal of the commutation switch element Q3, for controlling the application of the electromotive voltage of the auxiliary winding N14 of the transformer T1; the control switch element driver circuit 24 for turning ON the first commutation switch turn OFF control switch element Q5 when the main switch element Q1 is ON; and the primary side control stop detection circuit 25 for detecting the control stop state of the switching control circuit 23 and also turning ON the second commutation switch turn OFF control switch element Q9, the first commutation switch turn OFF control switch element Q5 controls the OFF timing of the commutation switch element Q3. When the switching of the main switch element Q1 is stopped, the second commutation switch turn OFF control switch element Q9 controls the ON period of the commutation switch element Q3. Thus, it is possible to suppress the decrease in the oscillation frequency of the self-oscillation operation generated when the switching of the main switch element Q1 is stopped. As a result, the stresses on the rectification switch element Q2 and the commutation switch element Q3 can be alleviated.

9. With the provision of the rectification switch turn ON control switch element Q8 that is connected in series to the drive current supply path for the ON control signal from one terminal of the secondary winding N12 of the transformer T1 to the control terminal of the rectification switch element Q2; and the primary side control stop detection circuit 25 for detecting the control stop state of the switching control circuit 23 and for turning OFF the rectification switch turn ON control switch element Q8, at the time of the switching stop of the main switch element Q1, the ON period of the rectification switch element Q2 is restricted to stop the synchronous rectification of the rectification switch element Q2. As a result, the self-oscillation operation is stopped also at the time of the switching stop of the main switch element Q1. Thus, it is possible to stop the backflow completely.

Other features and advantages of the present invention will become apparent from the following description of embodiments of invention which refers to the accompanying drawings.

DESCRIPTION OF THE EMBODIMENTS OF THE INVENTION

Reference Numerals

Figure 1:
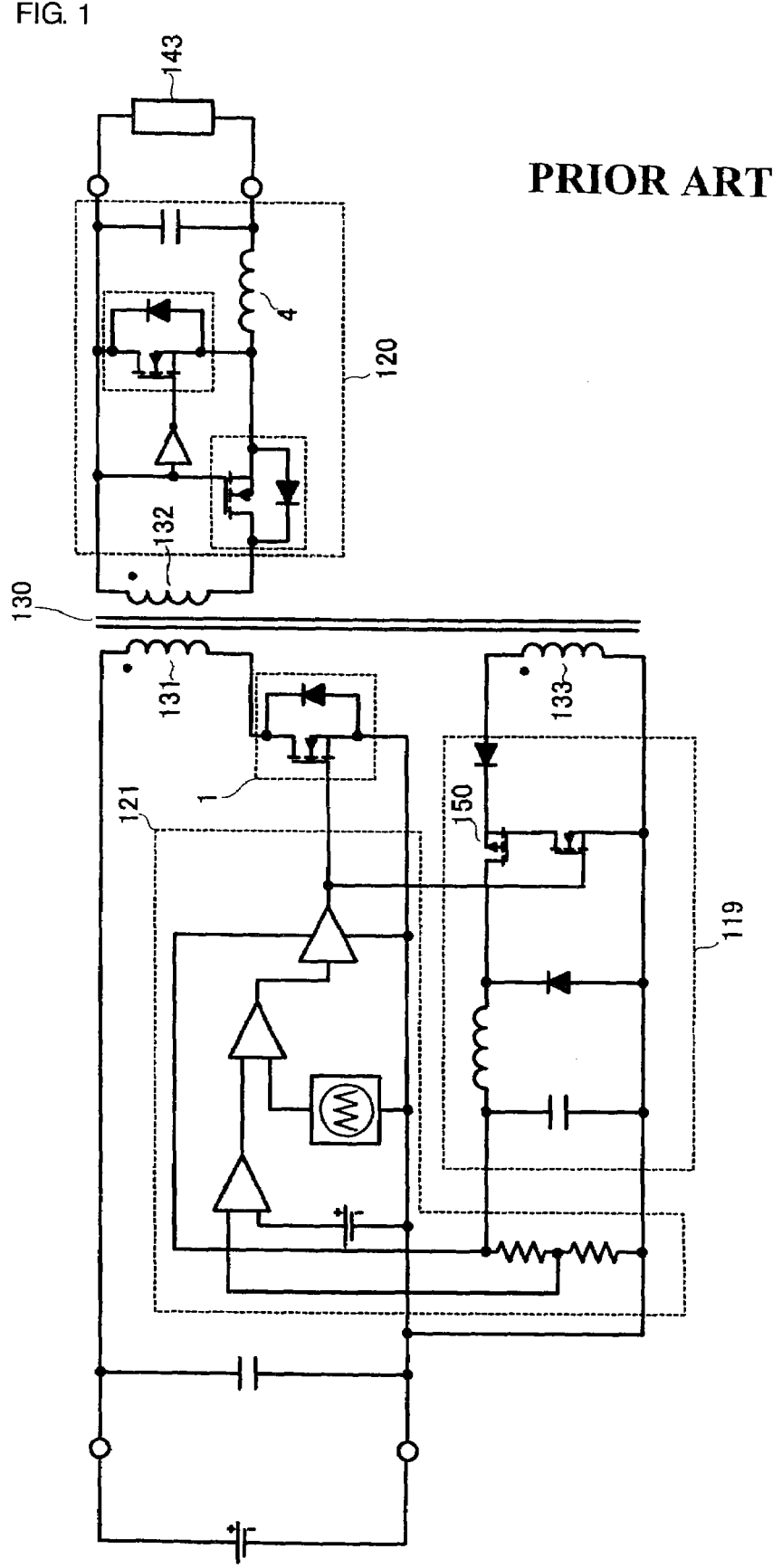
FIG. 1 is a circuit diagram illustrating a configuration of a converter according to Japanese Unexamined Patent Application Publication No. 2004-208444.
Figure 2:
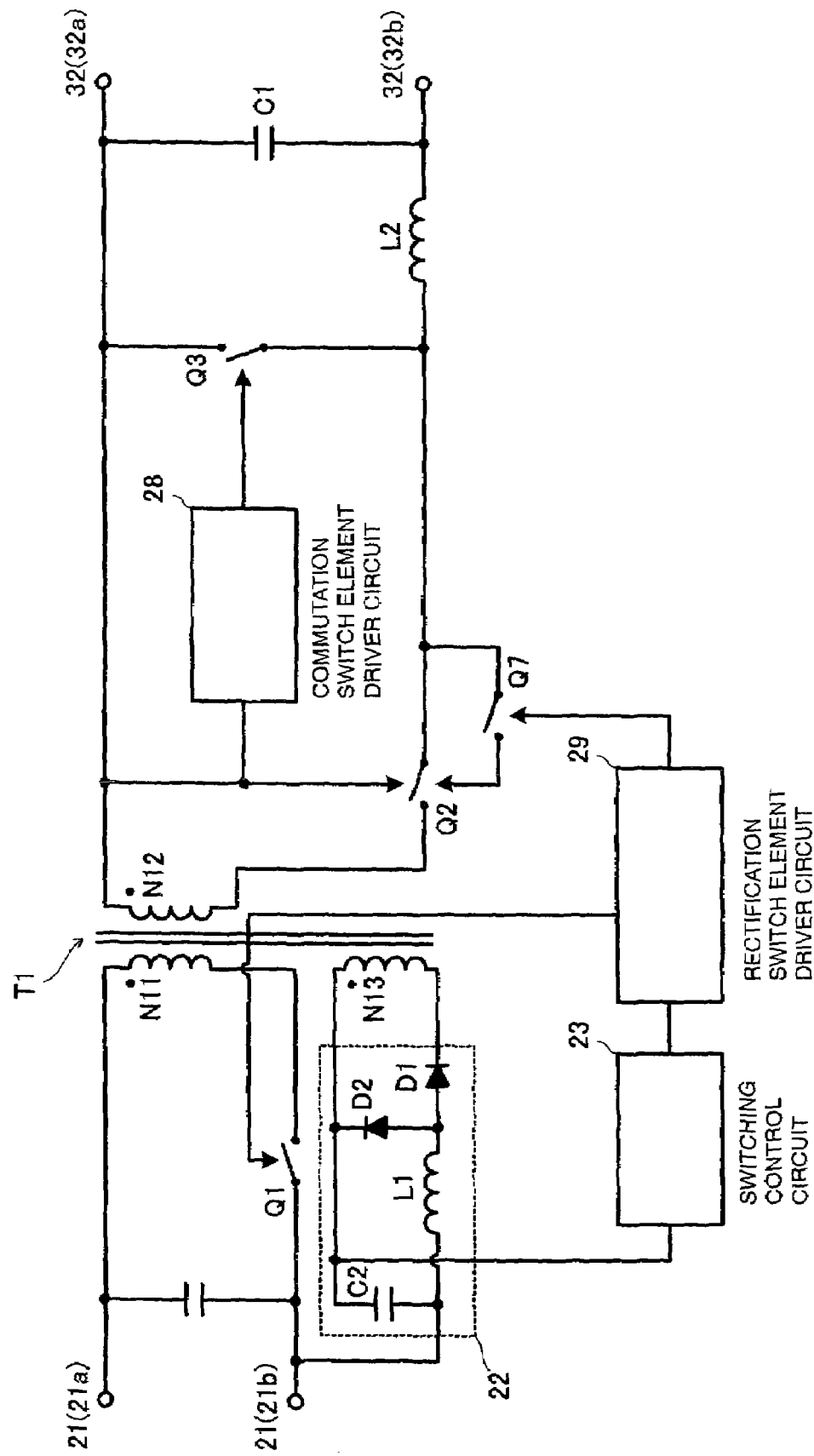
FIG. 2 is a circuit diagram of a synchronous rectification forward converter according to a first embodiment of the invention.

T1 main transformer
21 input terminal
22 tertiary rectification smoothing circuit
23 switching control circuit
24 control switch element driver circuit
25 primary side control stop detection circuit
26 control voltage signal generation circuit
27 primary side control stop moment control circuit
28, 30 commutation switch element driver circuit
29 rectification switch element driver circuit
31 switch element control circuit
32 output terminal
33 delay circuit
Q1 main switch element
Q2 rectification switch element
Q3 commutation switch element
Q5, Q9 commutation switch turn OFF control switch element
Q6 control switch element
Q7 rectification switch control switch element
Q8 control switch element
N1 primary winding
N2 secondary winding
N3 the tertiary winding
N4 the auxiliary winding
L1, L2 choke coil
C1 smoothing capacitor First Embodiment A description will be given of a configuration of a synchronous rectification forward converter according to a first embodiment on the basis of FIG. 2.

FIG. 2 is a circuit diagram of the synchronous rectification forward converter, a part of which is illustrated in a block diagram while being represented with symbols. As illustrated in FIG. 2, a main transformer T1 is provided with a primary winding N11, a secondary winding N12, and a tertiary winding N13. A main switch element Q1 is connected in series to the primary winding N1. A capacitor is connected between input terminals 21 (21a and 21b). A choke coil L2 and a rectification switch element Q2 are connected in series to the secondary winding N12 of the main transformer T1. A smoothing capacitor C1 is connected between output terminals 32 (32a and 32b). Then, a commutation switch element Q3 is provided at a position where the commutation switch element forms a loop with the choke coil L2 and the smoothing capacitor C1, the position also functioning as a commutation path at the time of release of an excitation energy of the choke coil L2. The control terminal of the commutation switch element Q3 is provided with a commutation switch element driver circuit 28 for delaying a signal generated in the secondary winding N12 of the main transformer T1 to drive the commutation switch element Q3.

A tertiary rectification smoothing circuit 22 that is composed of diodes D1 and D2, a choke coil L1, and a capacitor C2 is connected to the tertiary winding N13 of the main transformer T1. The switching control circuit 23 is configured to receive an output of the tertiary rectification smoothing circuit 22 as a power supply and an output voltage detection signal and to output a switching control signal to the main switch element Q1.

The circuit is configured in such a manner that an electromotive voltage of the secondary winding N12 of the main transformer T1 is applied to the control terminal of the rectification switch element Q2. Then, a rectification switch control switch element Q7 for controlling the control voltage of the rectification switch element Q2 is connected to the control terminal of this rectification switch element Q2. A rectification switch element driver circuit 29 is configured to input the switching control signal that is output from the switching control circuit 23 with respect to the main switch element Q1, and control the rectification switch control switch element Q7 at a timing in synchronism with the input.

The operation of the synchronous rectification forward converter illustrated in FIG. 2 is as follows.

<Normal Operation>

First, the main switch element Q1 is turned ON in response to a voltage applied to a gate of the main switch element Q1 from the switching control circuit 23. After Q1 is turned ON, a current flows into the primary winding N11 of the main transformer T1. Along with this state, the rectification switch element Q2 is turned ON in response to the electromotive voltage of the secondary winding N12. A current then flows in a path of N12→C1→L2→Q2→N12. Thus, C1 is charged. At the same time, an excitation energy is accumulated at L2. At this time, the commutation switch element driver circuit 28 does not turn ON the commutation switch element Q3, and therefore Q3 is in the OFF state as it is.

In accordance with the control of the switching control circuit 23, when the main switch element Q1 is turned OFF, the electromotive voltage of the secondary winding N12 is inverted and the control terminal voltage of Q2 is inverted. Thus, Q2 is turned OFF. Then, the commutation switch element driver circuit 28 turns ON the commutation switch element Q3 with a delay for a certain period from this inversion timing of the transformer voltage. As a result, a commutation is occurred in a path of L2→Q3→C1→L2.

In accordance with the above-mentioned ON-OFF of the main switch element Q1, the rectification and the commutation described above are repeatedly performed.

<Excess Voltage Application (Backflow) from the Output Side>

In a case where an abnormal voltage equal to or larger than a normal operation voltage is applied from the output or a case where an excess voltage is generated at the output upon a transient sudden change of an output load, if no effective measures are taken, the choke coil L2 is excessively excited as compared with the case of the normal operation.

In view of the above, in synchronism with the OFF of the main switch element Q1, the rectification switch element Q2 is forcedly turned OFF. As a result, such a state is established that the rectification switch element Q2 and the commutation switch element Q3 are concurrently turned OFF. Accordingly, a free resonance is generated between the choke coil L2 and the rectification switch element Q2. Due to this free resonance, the choke coil L2 is reset. Therefore, the induced voltage of the tertiary winding N13 in the transformer T1 is stabilized.

As a result, while the ON period of Q1 (the On state of the main transformer T1) is controlled in order that the output voltage of the tertiary rectification smoothing circuit 22 is constant, it is possible to perform the stable control for the output voltage.

In addition, as the excitation period of the transformer is not increased, in a case where the commutation switch element Q3 is driven by utilizing the winding of the transformer T1, it is possible to stop the generation of an abnormal oscillation where the control of the switching control circuit 23 on the primary side and the control due to the excitation of the choke coil L2 on the secondary side are mixed (that is, a state where even when the switching control circuit 23 on the primary side is operated stably, the secondary side has the abnormal oscillation).

Furthermore, the ON period of the transformer is extended beyond the range of the control of the switching control circuit 23. Thus, it is possible to eliminate the problem that the excitation state of the main transformer T1 cannot be reset and a stress is imparted on the main switch element Q1 after an excess voltage is generated at a drain voltage of the main switch element Q1.

Specific actions are as follows.

When an abnormal voltage Vab equal to or larger than a normal operation voltage Vo is generated at the output, the abnormal voltage is applied to the choke coil L2 for excitation at the time of turning ON of Q3. In the forward converter of a choke input rectification as in this embodiment, when an ON duty of the main transformer T1 is set as D, a winding number of the primary winding N11 of the main transformer T1 is set as n1, a winding number of the secondary winding N12 of the main transformer T1 is set as n2, a winding number of the tertiary winding of the main transformer T1 is set as n3, a secondary output voltage is set as vo, a tertiary output voltage is set as vt, and an input voltage is set as vin, the following expressions are normally established.

$$Vo=(n2/n1)\times D\times Vin \quad (1)$$

$$Vt=(n3/n1)\times D\times Vin \quad (2)$$

In a case where an abnormal voltage is generated, when a switching cycle is set as T and a rated output voltage is set as Voc, a magnetic flux density $\Delta B$ represented in the next expression is generated at the choke coil L2.

$$\Delta B=Vab(1-D)/T>\Delta Bc=Voc(1-D)/T \quad (3)$$

Herein, $\Delta Bc$ denotes the amount of change of the magnetic flux density generated at the choke coil L2 at the time of the rated voltage output.

This $\Delta B$ needs to be reset during the ON period of the transformer. When the reset voltage upon the rated voltage is set as V12rc, the voltage of the choke coil L2 during the ON period of the transformer is suppressed by the input voltage Vin and the output abnormal voltage Vab. Then, a choke coil reset voltage V12r has the following relation.

$$V12r=(n2/n1)\times Vin-Vab<V12rc \quad (4)$$

When a time required for resetting $\Delta B$ is set as t12r and a reset period of the normal operation is set as t12rc, the following relation is established.

$$t12r=\Delta B/v12r>t12rc=\Delta Bc/v12rc$$

Therefore, the period is longer than the normal ON period of the transformer. This operation is commonly performed when a secondary transformer winding is used for the drive of the rectification switch element Q2 because the OFF of the rectification switch element Q2 is not controlled by the switching control circuit on the primary side.

In the above-mentioned configuration, the rectification switch element Q2 is turned OFF concurrently with the main switch element Q1, the choke coil L2 on the secondary side and the output capacitance of the rectification switch element Q2 (a parasitic capacitance present in parallel to the switch) have a free resonance phenomenon. Thus, it is possible to reset ΔB described above for a period shorter than tl2r. In a case where a half cycle Tres of the resonance frequency of the above-mentioned free resonance has a relation of D·T>Tres, the increase in the ON period of the transformer due to the excitation of the choke coil L2 can be avoided. While the output pulse from the switching control circuit 23 is set shorter, the ON period of the transformer is not extended. Accordingly, the control is performed in such a state that the voltage of the tertiary winding N13 is not increased.

Second Embodiment

Next, a description will be given of a configuration of a synchronous rectification forward converter according to a second embodiment on the basis of FIGS. 3 and 4.

Figure 3:
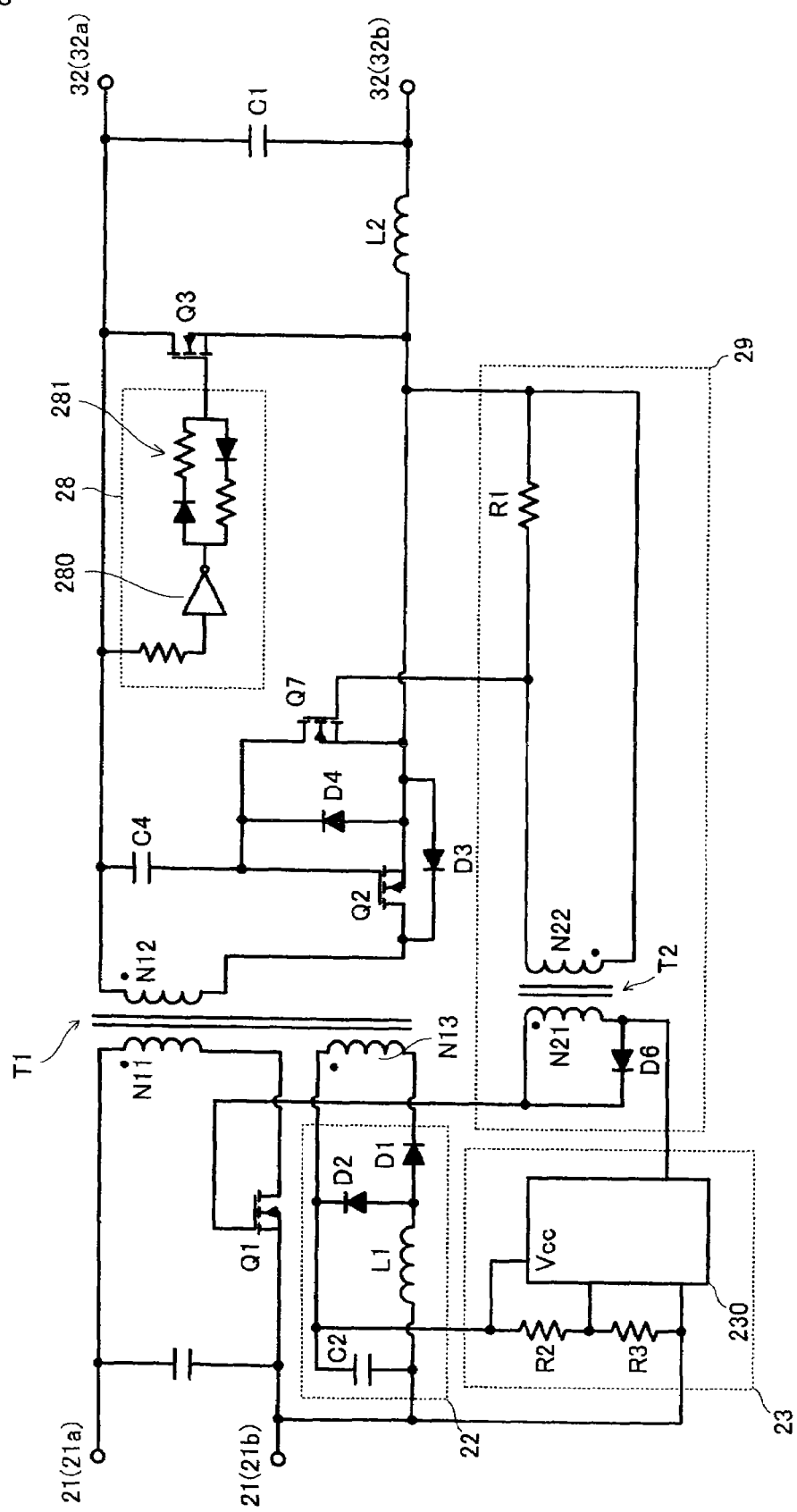
FIG. 3 is a circuit diagram of a synchronous rectification forward converter according to a second embodiment.
Figure 4:
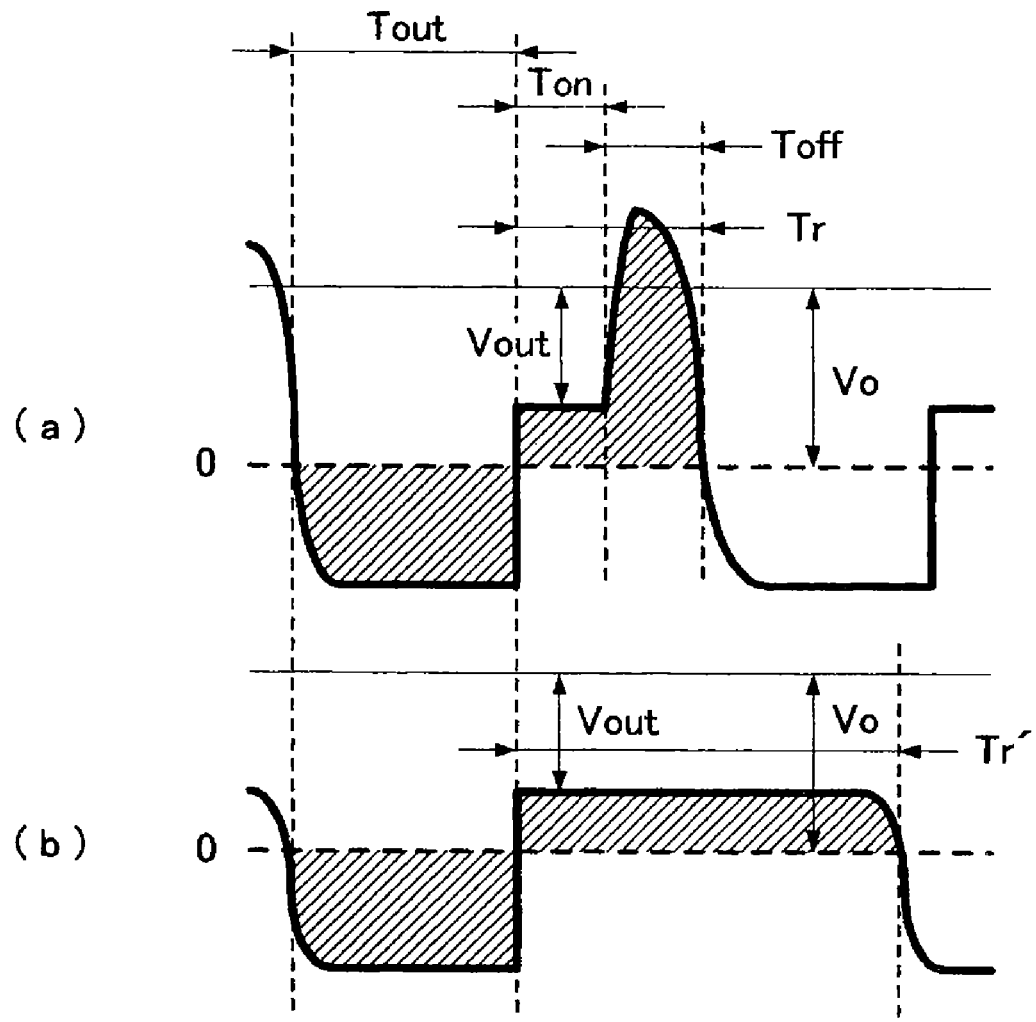
FIG. 4 shows waveform charts of a main part of the converter.

FIG. 3 is a circuit diagram of the synchronous rectification forward converter according to the second embodiment and FIGS. 4A and 4B are waveform charts of a main part thereof.

As illustrated in FIG. 3, the switching control circuit 23 is operated while the output from the tertiary rectification smoothing circuit 22 is used as the power supply. Also, the switching control circuit 23 is provided with a switching control IC 230 for inputting a divided voltage generated by resistors R2 and R3. The switching control IC 230 is configured to output the switching control signal to the gate of the main switch element Q1 via a primary winding N21 of the pulse transformer T2. At that time, on the basis of the input divided voltage described above and a reference voltage, the main switch element Q1 is subjected to a PWM control so that the above-mentioned divided voltage is matched to the reference voltage. A diode D6 for excitation reset of the pulse transformer T2 is connected to the primary winding N21 of the pulse transformer T2.

A parallel diode D3 is connected between the drain and the source of the rectification switch element Q2. A capacitor C4 is connected to the gate of the rectification switch element Q2 so that the electromotive voltage of the secondary winding N12 in the main transformer T1 is applied via the capacitor C4. The rectification switch control switch element Q7 is connected between the drain and the source of the rectification switch element Q2. Then, similarly, the diode D4 for keeping the ground potential is connected between the gate and the source of the rectification switch element Q2 so that a negative potential is not applied to the gate of the rectification switch element Q2. The commutation switch element driver circuit 28 is connected to the gate of the commutation switch element Q3. The commutation switch element driver circuit 28 is provided with a driver IC 280 and a diode/resistor circuit 281. The commutation switch element driver circuit controls the commutation switch element Q3 on the basis of a signal generated at the secondary winding N12 of the main transformer T1.

A signal amplitude adjustment resistor R1 is connected to a secondary winding N22 of the pulse transformer T2 so that a control signal is supplied to the gate of the rectification switch control switch element Q7. The pulse transformer T2, the diode D6, and the resistor R1 constitute the rectification switch element driver circuit 29.

The rectification switch control switch element Q7 mentioned above is in the OFF state because the gate is normally at the ground level. Only when a signal for turning OFF the main switch element Q1 is sent from the switching control circuit 23 (at a fall timing of the signal applied to the gate of Q1), the rectification switch control switch element Q7 is turned ON in response to a pulse transmitted via the pulse transformer T2. In accordance with this turning ON of Q7, the gate voltage of the rectification switch element Q2 falls to the ground. Then, Q2 is forcedly turned OFF. With this configuration, even at the time of the backflow, in synchronism with the OFF of Q1, Q2 is forcedly turned OFF.

FIG. 4(A) illustrates a change in an end-to-end voltage of the choke coil L2 illustrated in FIG. 3. FIG. 4(B) illustrates an example of a change in the end-to-end voltage of a (conventional) choke coil L2 which is not provided with the rectification switch control switch element Q7 of FIG. 3. Herein, Tout denotes an excitation period due to the output, Ton denotes an ON period of the rectification switch element Q2(=an ON period of the main switch element Q1), and Toff denotes an OFF period of the rectification switch element Q2 and the commutation switch element Q3. When the areas of hatching parts in positive and negative sections in the drawing are equal to each other, the reset of the excitation state is completed. That is, Ton+Toff(=Tr) is a reset period of the choke coil L2.

The above-mentioned voltage Vout of Q2 in the ON period Ton is the output voltage. (This voltage is fixed due to an external application voltage.) The voltage Vo is represented by the following expression in which the winding numbers of the primary winding N11 and the secondary winding N12 of the main transformer T1 are respectively set as n11 and n12 and an input voltage is set as Vin.

$Vo=(n12/n11)Vin.$

On the other hand, as illustrated FIG. 4(B), in a case where the rectification switch element Q2 is not turned OFF in synchronism with the OFF of the main switch element Q1 at the time of the backflow, a reset period Tr' of the choke coil L2 becomes longer. For that reason, as described above, in a state where the transformer excitation period is not extended and the voltage of the tertiary winding N13 is not increased, the control of the switching control circuit 23 on the primary side is performed. As a result, the ON (ON of the main transformer T1) period of Q1 is controlled so that the output voltage of the tertiary rectification smoothing circuit 22 is constant. Thus, it is possible to control the output voltage with stability. In addition, the generation of the abnormal oscillation can be stopped. Furthermore, it is possible to eliminate the problem of the stress on the main switch element Q1 which is caused when the ON period of the transformer is extended beyond the range of the control of the switching control circuit 23 and the excitation state of the main transformer T1 cannot be reset.

Third Embodiment

Next, a configuration of a synchronous rectification forward converter according to a third embodiment will be described on the basis of FIGS. 5 and 6.

Figure 5:
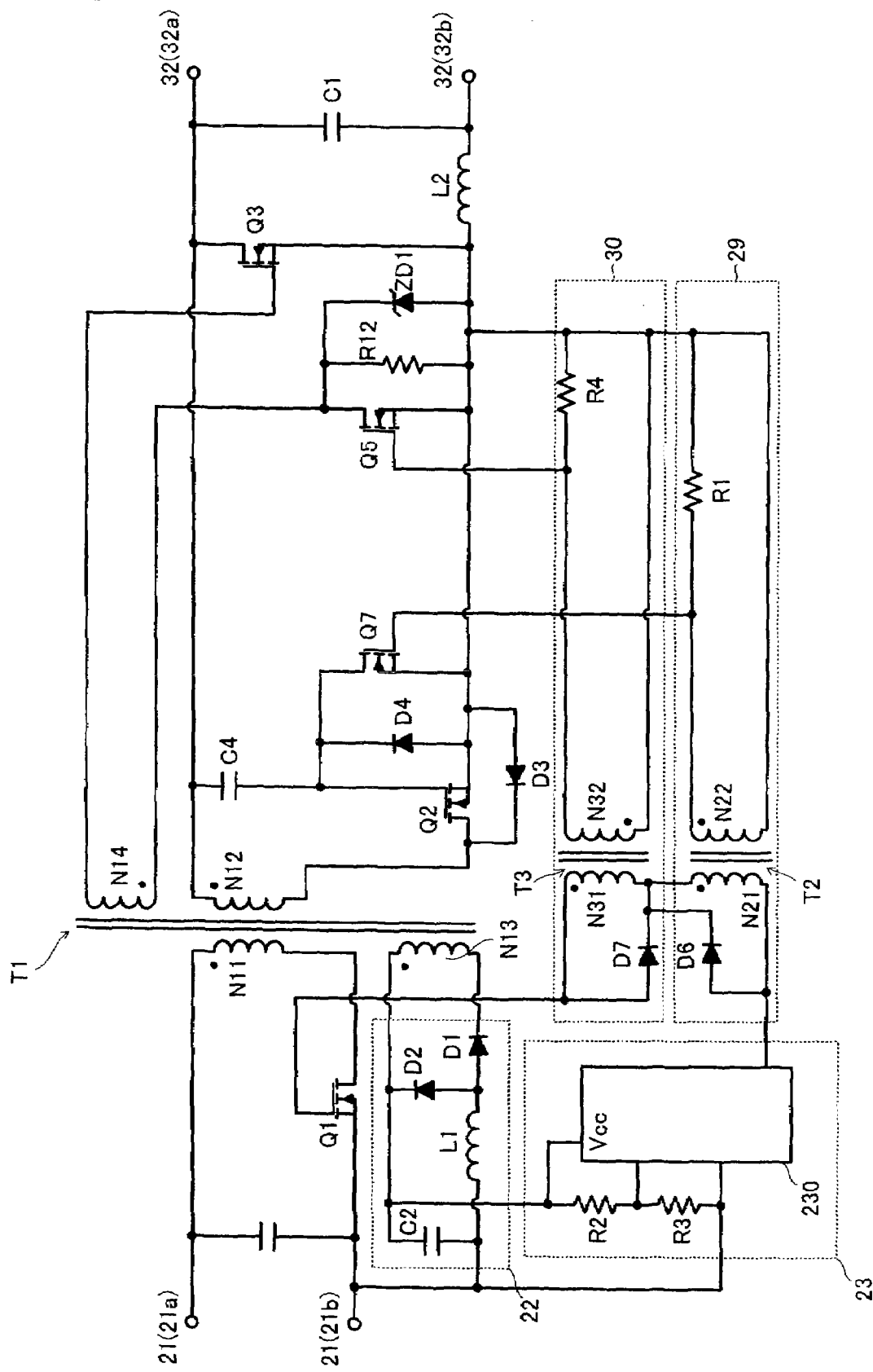
FIG. 5 is a circuit diagram of a synchronous rectification forward converter according to a third embodiment.
Figure 6:
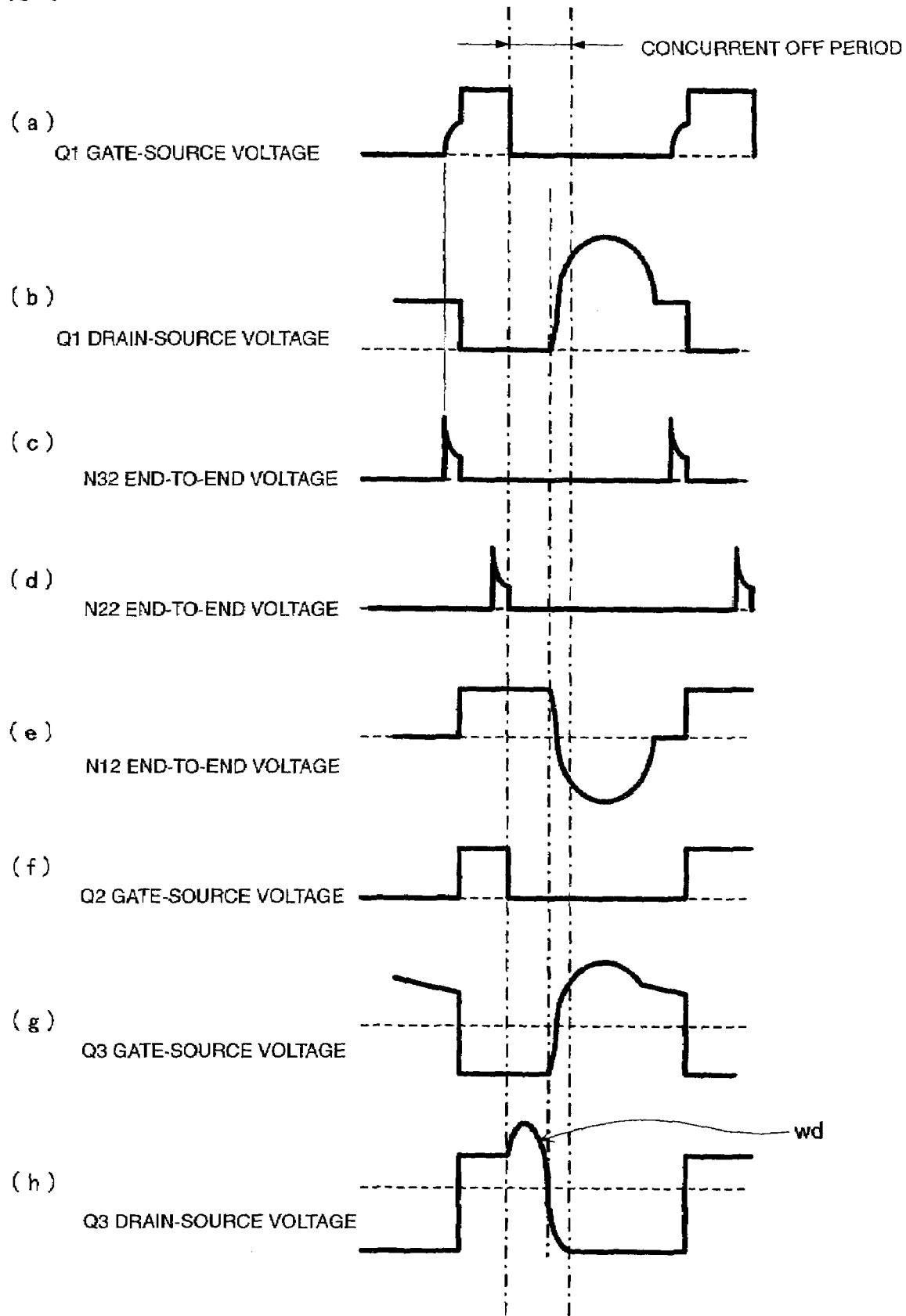
FIG. 6 shows waveform charts of a main part of the converter.

FIG. 5 is a circuit diagram of the synchronous rectification forward converter according to the third embodiment and FIG. 6 is waveform charts of a main part thereof.

As illustrated in FIG. 5, one terminal of the auxiliary winding N14 of the main transformer T1 is connected to the gate of the commutation switch element Q3. The other terminal of the auxiliary winding N14 is connected to the commutation switch turn OFF control switch element Q5. A resistor R12 for adjusting the gate voltage of the commutation switch element Q3 and a zener diode ZD1 for the gate voltage of Q3 are connected between the drain and the source of the commutation switch turn OFF control switch element Q5.

A resistor R4 for adjusting the output voltage of the pulse transformer T2 is connected to a secondary winding N32 of the pulse transformer T3. In addition, one terminal of the secondary winding N32 of the pulse transformer T3 is connected to the gate of the commutation switch turn OFF control switch element Q5. A diode D7 for resetting the excitation is connected to a primary winding N31 of the pulse transformer T3, which is connected in series to the primary winding N21 of the pulse transformer T2. The pulse transformer T3, the diode D7, and the resistor R4 constitute the commutation switch element driver circuit 30.

Other configurations and actions are similar to those illustrated in FIG. 3.

An OFF timing of the main switch element Q1 is, similarly to the case of FIG. 3, transmitted to the secondary side by the pulse transformer T2. The rectification switch control switch element Q7 is turned ON and the rectification switch element Q2 is turned OFF. Similarly to the case illustrated in FIG. 3, the ON period of Q1 is controlled so that the output voltage of the tertiary rectification smoothing circuit 22 is constant. Thus, it is possible to stably control the output voltage. In addition, the generation of the abnormal oscillation can be stopped. Furthermore, it is possible to eliminate the problem of the stress on the main switch element Q1 which is caused when the ON period of the transformer is extended beyond the range of the control of the switching control circuit 23 and the excitation state of the main transformer T1 cannot be reset.

Moreover, in this example illustrated in FIG. 5, the ON timing signal of the main switch element Q1 is transmitted on the secondary side by the pulse transformer T3. Then, the commutation switch turn OFF control switch element Q5 is turned OFF in synchronism with Q1. For that reason, when Q1 is ON, a short circuit current generated in a path of N12→Q3→D3 can be suppressed by the turning OFF of Q3. Thus, it is possible to reduce the loss.

In addition, the auxiliary winding N14 of the main transformer T1 is used for the drive of the commutation switch element Q3, the concurrent OFF period of Q2 and Q3 at the time of the inversion of the transformer voltage of the main transformer T1 can be realized without a delay circuit. FIG. 6 is waveform charts illustrating the effects.

FIG. 6(a) represents a voltage between the gate and the source of Q1, FIG. 6(b) represents a voltage between the drain and the source of Q1, FIG. 6(c) represents an end-to-end voltage of N32, FIG. 6(d) represents an end-to-end voltage of N22, FIG. 6(e) represents an end-to-end voltage of N12, FIG. 6(f) represents a voltage between the gate and the source of Q2, FIG. 6(g) represents a voltage between the gate and the source of Q3, and FIG. 6(h) represents a voltage between the drain and the source of Q3. In particular, as represented by a waveform Wd in FIGS. 6(g) and 6(h), the voltage between the drain and the source of Q3 during the concurrent OFF period of Q2 and Q3 has a resonance (free resonance) waveform defined by a resonance between the choke coil L2 and a parallel capacitance of Q2 and Q3. Then, a voltage waveform generated at the gate of Q3 is equal to or smaller than 0 V with the voltage of the transformer T1 clamped by the input voltage. Accordingly, Q3 is turned OFF while the voltage is raised to a gate threshold voltage of Q3. Therefore, it is possible to realize the concurrent OFF period of Q2 and Q3 at the time of the inversion of the transformer voltage of the main transformer T1 without the delay circuit.

Fourth Embodiment

Next, a description will be given of a configuration of a synchronous rectification forward converter according to a fourth embodiment on the basis of FIGS. 7 and 8.

Figure 7:
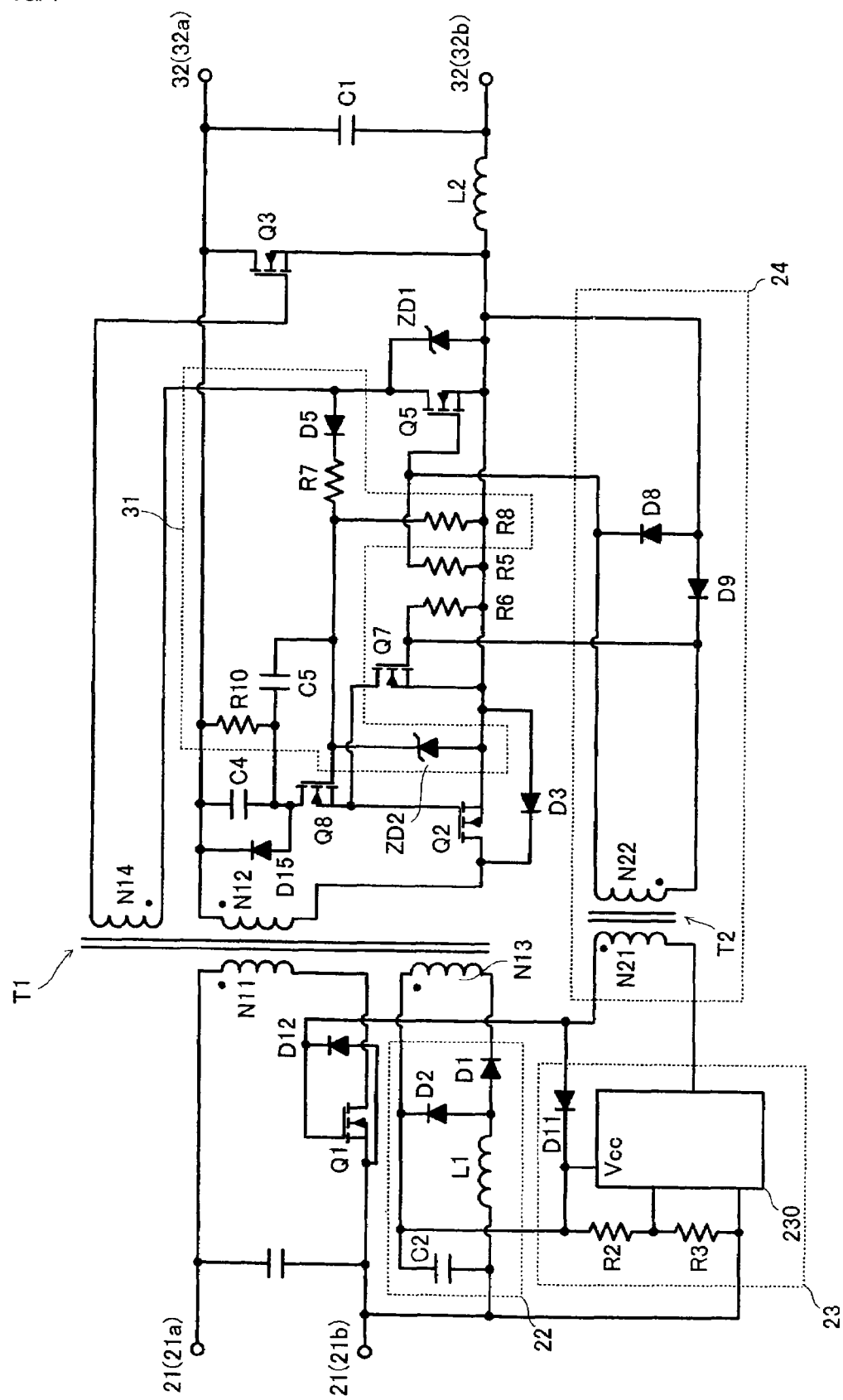
FIG. 7 is a circuit diagram of a synchronous rectification forward converter according to a fourth embodiment.
Figure 8:
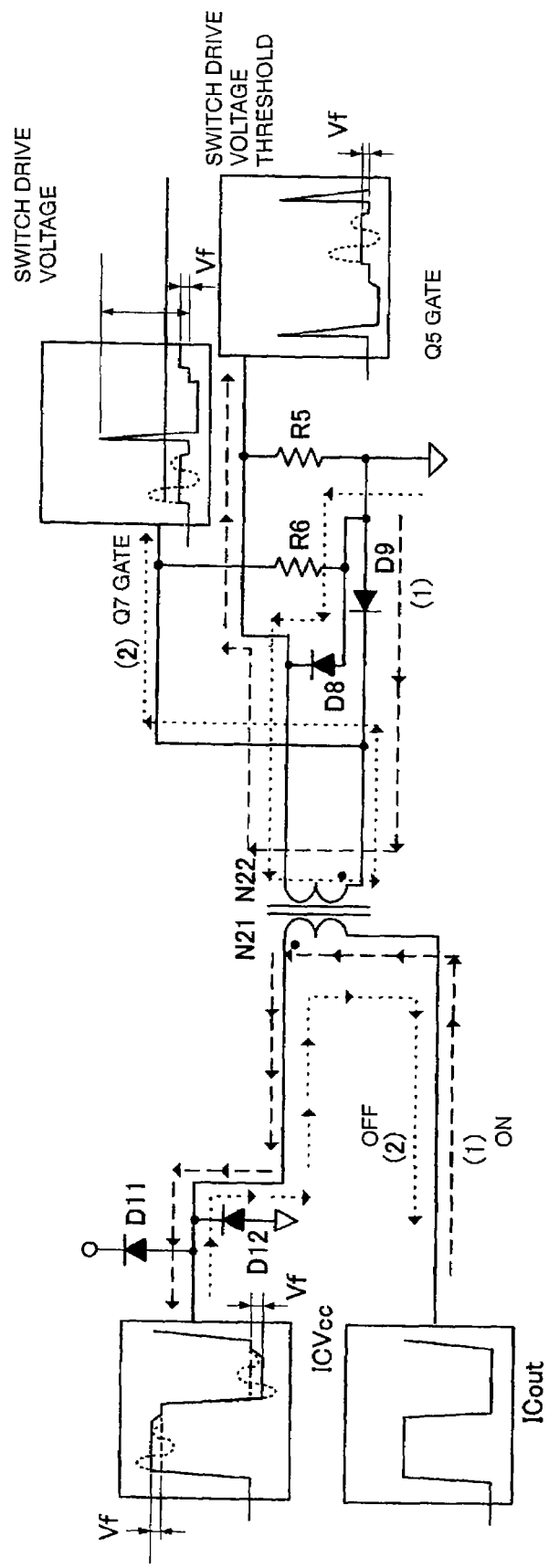
FIG. 8 is a waveform chart of a main part of the converter.

FIG. 7 is a circuit diagram of the synchronous rectification forward converter according to a fourth embodiment and FIG. 8 illustrates a waveform chart of a main part thereof and a flow of a signal.

The secondary winding N22 of the pulse transformer T2 is provided with a diode bridge composed of diodes D8 and D9. The pulse transformer T2 and the diodes D8 and D9 constitute a control switch element driver circuit 24. The control switch element driver circuit 24 has both the functions of the rectification switch element driver circuit 29 and the commutation switch element driver circuit 30 illustrated in FIG. 5. That is, the reset diode on the primary side of the pulse transformer T2 is eliminated. Instead, diodes D11 and D12 for clamping are provided. In addition, the diode bridge formed of the diodes D8 and D9 is provided on the secondary side of the pulse transformer T2. The diodes D11 and D12 are configured to reset the excitation at the time of ON and OFF of the pulse transformer T2.

With this configuration, an ON signal and an OFF signal of the main switch element Q1 are separated on the secondary side of the pulse transformer T2. With use of the single pulse transformer, an OFF timing of the rectification switch element Q2 and an OFF timing of the commutation switch element Q3 are controlled.

Such a configuration is adopted that an electromotive voltage of the secondary winding N12 in the main transformer T1 is applied to the gate of the rectification switch element Q2 via the capacitor C4 and the control switch element Q8. The control switch element Q8 is OFF when Q7 is ON. Thus, a current is prevented from flowing into the secondary winding N12 of the main transformer via T1→C4→Q7 to suppress the loss of Q7. A switch element diode bridge 31 composed of a resistor R10, the resistors R7 and R8, a capacitor C5, a diode D5, a zener diode ZD2 is provided between the drain of the control switch element Q8 and the drain of the commutation switch turn OFF control switch element Q5.

The control switch element Q8 is turned ON when a capacitance between the gate and the source is charged with the current that is input via the diode D5. The diode D5 is configured to prevent the backflow from Q8 to Q3. The diode D15 functions as a discharge path of the capacitor C4. The zener diode ZD1 is provided for adjusting the gate voltage of Q3. The zener diode ZD2 limits an upper limit of the gate voltage of Q2 for protection. The resistors R5 and R6 are resistors for adjusting a gate voltage impedance of Q5 and Q7. The resistors R7 and R8 are resistors for adjusting the gate voltage of Q8.

It should be noted that the zener diode ZD2 is connected in parallel to the resistor R8 and thus the gate voltage of Q2 can be kept in a given value range. However, under a condition where Q2 operates normally, the zener diode ZD2 is not necessarily provided. Also, a part of the capacitor C5 and the resistor R10 is used for compensating the current that is input via the diode D5 when the current is insufficient. Thus, the part is not necessarily provided as well.

The actions of the diode bridge circuit composed of the diodes D8 and D9 are as illustrated in FIG. 8. (1) in FIG. 8 represents a signal voltage polarity when Q1 is ON and (2) represents a signal voltage polarity when Q1 is OFF. In FIG. 8, ICVcc denotes a power supply voltage of the switching control IC 230 and ICout denotes a voltage at one terminal of the primary winding N21 in the pulse transformer T2. Then, the OFF timing signal of Q1 is applied to the gate of Q7 and the ON timing signal of Q1 is applied to the gate of Q5.

As illustrated in FIG. 8, the free resonance of the pulse transformer T2 is clamped by the diode D12 that is connected between the gate of the main switch element Q1 and the ground and the diode D11 that is connected between the gate of Q1 and the output of the tertiary rectification smoothing circuit 22. For that reason, for either one of the OFF timing signal of Q1 that is applied to the gate of Q7 and the ON timing signal of Q1 that is applied to the gate of Q5, the malfunction can be prevented because the oscillation due to the free resonance of the pulse transformer T2 (a waveform part indicated by broken lines in the drawing) does not exceed the threshold voltage of Q5 and Q7. It should be noted that Vf in the drawing denotes a forward drop voltage of the diode.

Fifth Embodiment

Next, a configuration of a synchronous rectification forward converter according to a fifth embodiment will be described on the basis of FIGS. 9 and 10.

Figure 9:
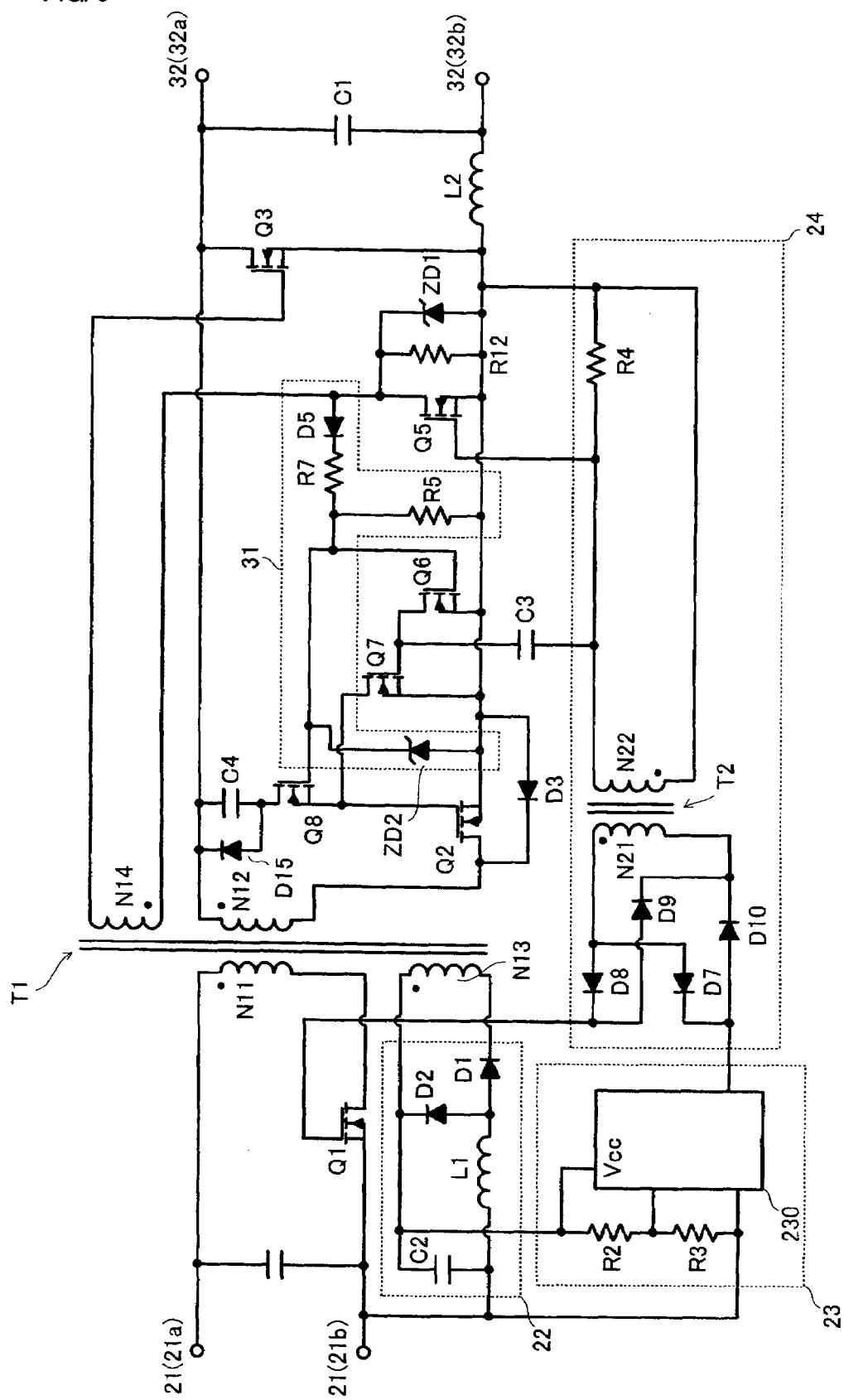
FIG. 9 is a circuit diagram of a synchronous rectification forward converter according to a fifth embodiment.
Figure 10:
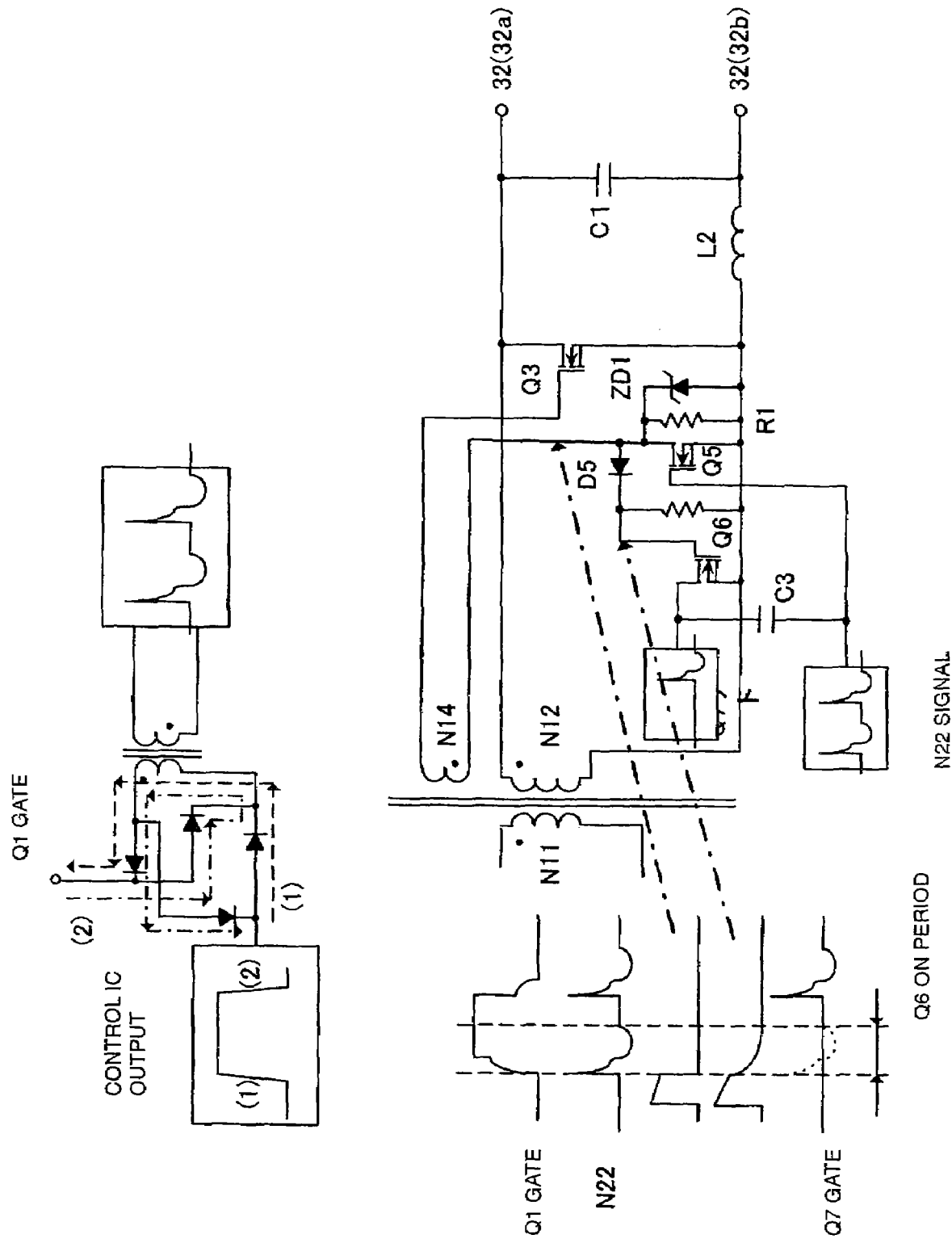
FIG. 10 is a waveform chart of a main part of the converter.

FIG. 9 is a circuit diagram thereof and FIG. 10 is a waveform chart of a main part thereof.

In this example, a diode bridge formed of the diodes D7 to D10 is provided on the primary side of the pulse transformer T2. The resistor R4 is connected to the secondary winding N22 of the pulse transformer T2. The control switch element driver circuit 24 is composed of the diodes D7 to D10, the pulse transformer T2, and the resistor R4.

Also, a control switch element Q6 is connected to the gate and the source of the rectification switch control switch element Q7. Then, a signal of the pulse transformer T2 on the secondary side is applied to the gate of the rectification switch control switch element Q7 via a capacitor C3 for signal diversion. Then, the switch element diode bridge 31 is provided between the gate of the control switch element Q8 and the drain of the commutation switch turn OFF control switch element Q5. Also, such a configuration is adopted that the voltage division is performed on the signal taken from the drain of Q5 by the resistors R7 and R5 to be applied to the gate of Q6. The diode D5 is provided for peak charge to the capacitance between the gate and the source of Q6 and Q8. The diode D5 may be inserted on the gate side of Q3.

With the provision of the diode bridge on the primary side of the pulse transformer T2 in this way, the same signals appear on the secondary side of the pulse transformer T2 at the ON timing and the OFF timing of Q1. Q5 uses the OFF timing of Q1 and Q7 uses the ON timing of Q1. From the beginning, Q5 is conducted via a body diode at the OFF timing of Q1. Thus, there is no problem when Q5 is turned ON at the OFF timing of Q1. On the other hand, there is a problem if Q2 is turned OFF when Q7 is turned ON at the ON timing of Q1. Thus, Q6 is turned ON at the ON timing of Q1 to mask the ON timing signal of Q1 to be sent to the gate of Q7. Other configurations and actions are similar to those illustrated in FIG. 7.

It should be noted that the switch element diode bridge 31 for driving Q8 may be provided with the capacitor C5 and the resistor R10 similarly to the case illustrated in FIG. 7.

As illustrated in FIG. 10, a current flows into a path of the diode D10→N21→D8→Q1 at the rise of the signal that is output from the switching control IC 230. A current flows into a path of Q1→D9→N21→D7 at the fall of the switching control IC 230. A signal illustrated in the drawing appears on the secondary side of the pulse transformer T2. As Q6 is turned ON at the rise of the gate voltage of Q1, as illustrated in FIG. 10, the output of N22 to the gate voltage of Q7 is masked to thereby prevent the ON of Q7 (that is, the OFF of Q2).

Sixth Embodiment

Next, a configuration of a synchronous rectification forward converter according to a sixth embodiment will be described on the basis of FIG. 11.

Figure 11:
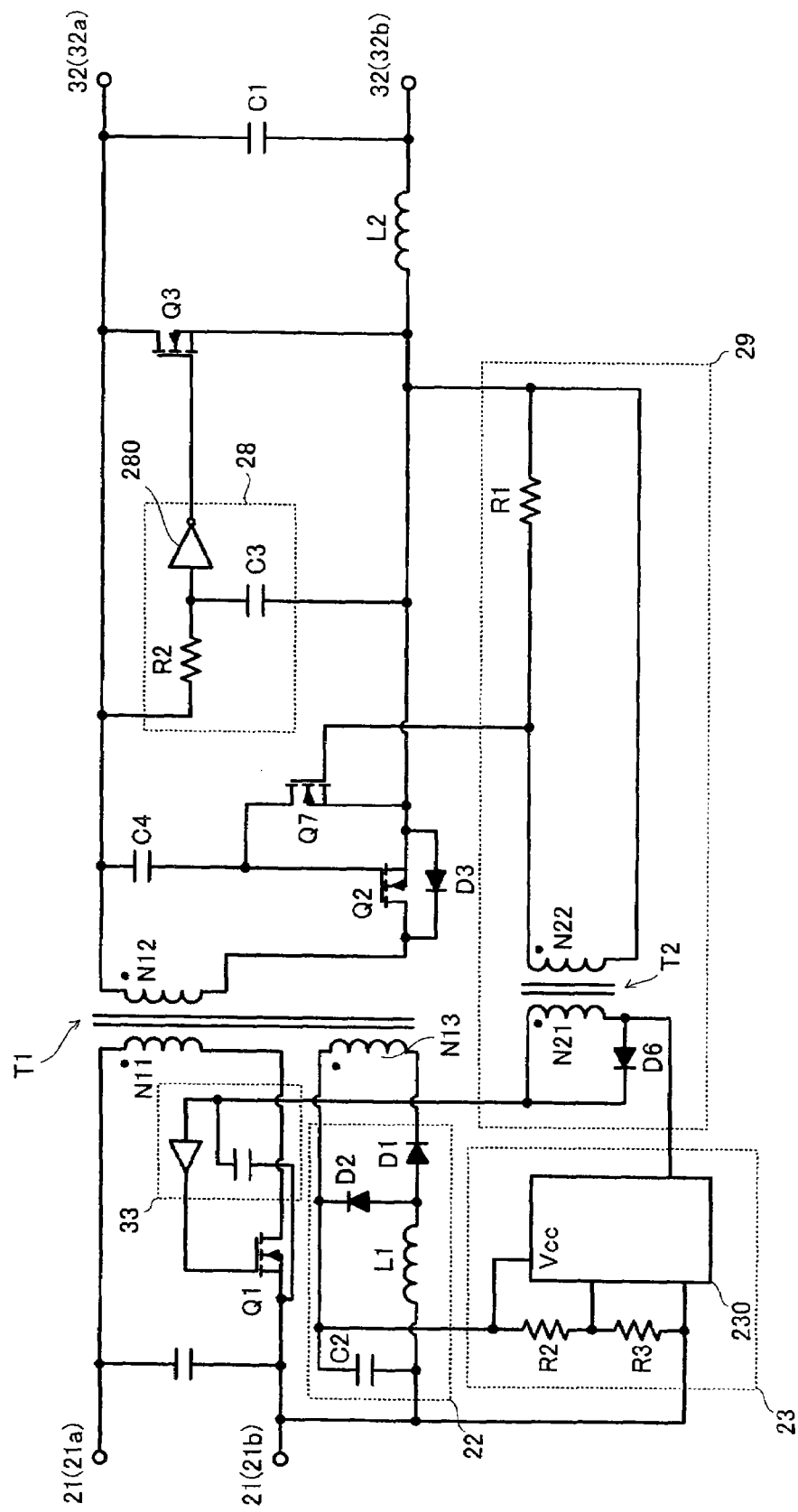
FIG. 11 is a circuit diagram of a synchronous rectification forward converter according to a sixth embodiment.

FIG. 11 is a circuit diagram thereof. A difference from the circuit illustrated in FIG. 3 according to the second embodiment resides in the configuration of the commutation switch element driver circuit 28 and the configuration of the circuit that is connected to the gate of the main switch element Q1. In this example illustrated in FIG. 11, a signal of the primary winding N21 in the pulse transformer T2 is not directly applied to the gate of Q1 (the pulse transformer T2 and the control signal path to Q1 are separated from each other) but such a configuration is adopted that the signal is applied via the delay circuit 33 including the control IC. Even with such a configuration, the concurrent ON of Q2 and Q3 can be avoided so it is possible to suppress the loss.

The commutation switch element driver circuit 28 is composed of the resistor R2, the capacitor C3, and the driver IC 280. The commutation switch element driver circuit performs waveform shaping and delay on the electromotive voltage signal of the secondary winding N12 in the main transformer T1. With the provision of the commutation switch element driver circuit 28 as well, it is possible to independently adjust the OFF time delay for Q2 and Q1. It should be noted that a circuit for adjusting this ON and OFF delay time may be composed by providing to an output unit of the driver IC 280, a totem-pole circuit formed of a PNP transistor and an NPN transistor or a circuit which uses a delay time setting capacitor, a diode, and a resistor.

Seventh Embodiment

Next, a configuration of a synchronous rectification forward converter according to a seventh embodiment will be described on the basis of FIGS. 12 and 13.

Figure 12:
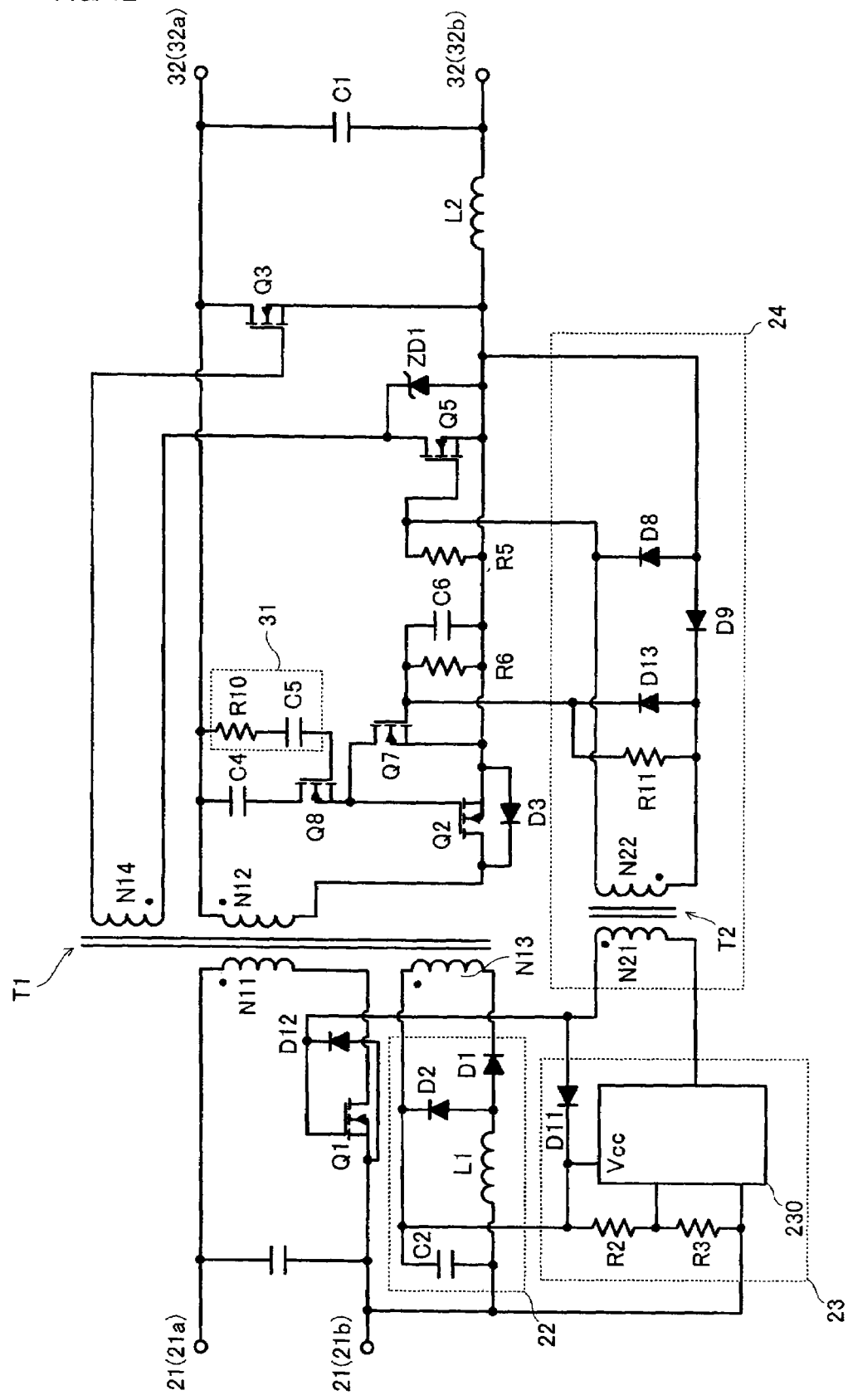
FIG. 12 is a circuit diagram of a synchronous rectification forward converter according to a seventh embodiment.

FIG. 12 illustrates a circuit thereof. A difference from the circuit illustrated in FIG. 7 resides in the configuration of the switch element diode bridge 31 and the configuration of a signal path from the secondary side of the pulse transformer T2 to the gate of Q7. In the example illustrated in FIG. 12, the gate of Q8 is provided with a delay circuit composed of the resistor R10 and the capacitor C5. With the delay circuit, such a configuration is adopted that Q8 is not allowed to be turned ON immediately in response to the ON timing of the rectification switch element Q2, and Q2 is turned ON with a delay from the transformer voltage. For that reason, a surge voltage generated at Q2 can be suppressed.

Figure 13:
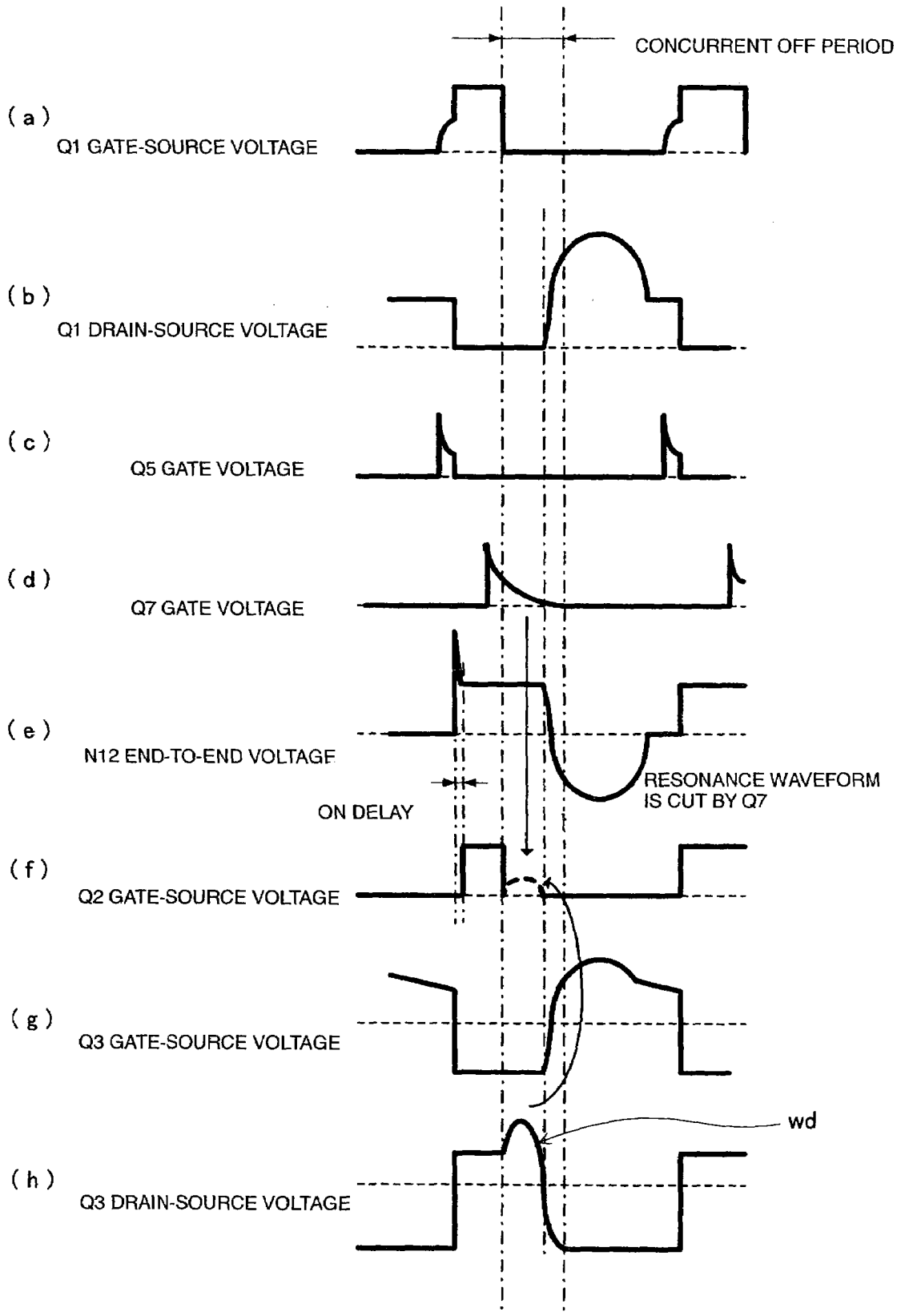
FIG. 13 shows waveform charts of a main part of the converter.

FIG. 13 illustrates waveform charts illustrating actions thereof. FIG. 13(a) represents a voltage between the gate and the source of Q1, FIG. 13(b) represents a voltage between the drain and the source of Q1, FIG. 13(c) represents a voltage of the gate of Q5, FIG. 13(d) represents a voltage the gate voltage of Q7, FIG. 13(e) represents an end-to-end voltage of N12, FIG. 13(f) represents a voltage between the gate and the source of Q2, FIG. 13(g) represents a voltage between the gate and the source of Q3, and FIG. 13(h) represents a voltage between the drain and the source of Q3. In particular, as illustrated in FIG. 13(h), a resonance waveform Wd of the voltage between the drain and the source of Q3 seems to be applied to the gate of Q2 during the concurrent OFF period of Q2 and Q3 as illustrated in FIG. 13(f). At this time, as Q7 is turned ON, the resonance waveform Wd is not actually applied to the gate of Q2.

Eighth Embodiment

Next, a configuration of a synchronous rectification forward converter according to an eighth embodiment will be described on the basis of FIG. 14.

Figure 14:
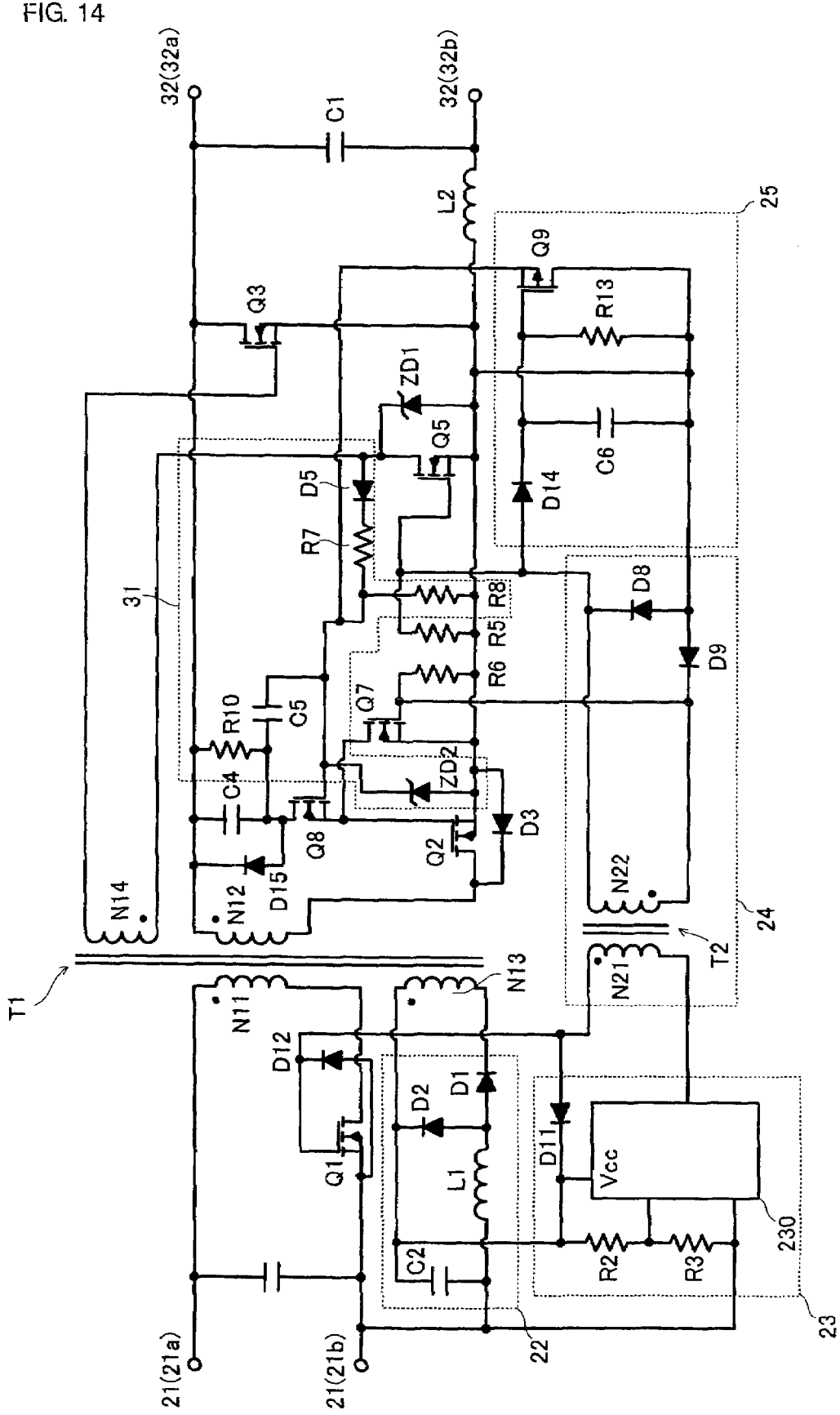
FIG. 14 is a circuit diagram of a synchronous rectification forward converter according to an eighth embodiment.

FIG. 14 is a circuit diagram thereof. The diode bridge composed of the diodes D8 and D9 is provided on the secondary side of the pulse transformer T2. In addition, the primary side control stop detection circuit 25 composed of a diode D14, a capacitor C6, a resistor R13, and the commutation switch turn OFF control switch element Q9 is also provided. The diode D14, the capacitor C6, and the resistor R13 constitute a rectification smoothing circuit. When the switching control of the switching control circuit 23 on the primary side is stopped, no voltage is generated at the secondary winding N22 of the pulse transformer T2. Thus, the electric charge of C6 continues to be discharged via R13. Then, the gate voltage of Q9 is decreased and Q9 is turned ON (Q9 is a depletion type p-channel MOS-FET). In accordance with the ON of Q9, the gate of Q8 is at the ground level and Q8 is turned OFF. As a result, Q2 is turned OFF and the self-oscillation operation is stopped.

Other configurations and actions are similar to those illustrated in FIG. 7.

Ninth Embodiment

Next a configuration of a synchronous rectification forward converter according to a ninth embodiment will be described on the basis of FIG. 15.

Figure 15:
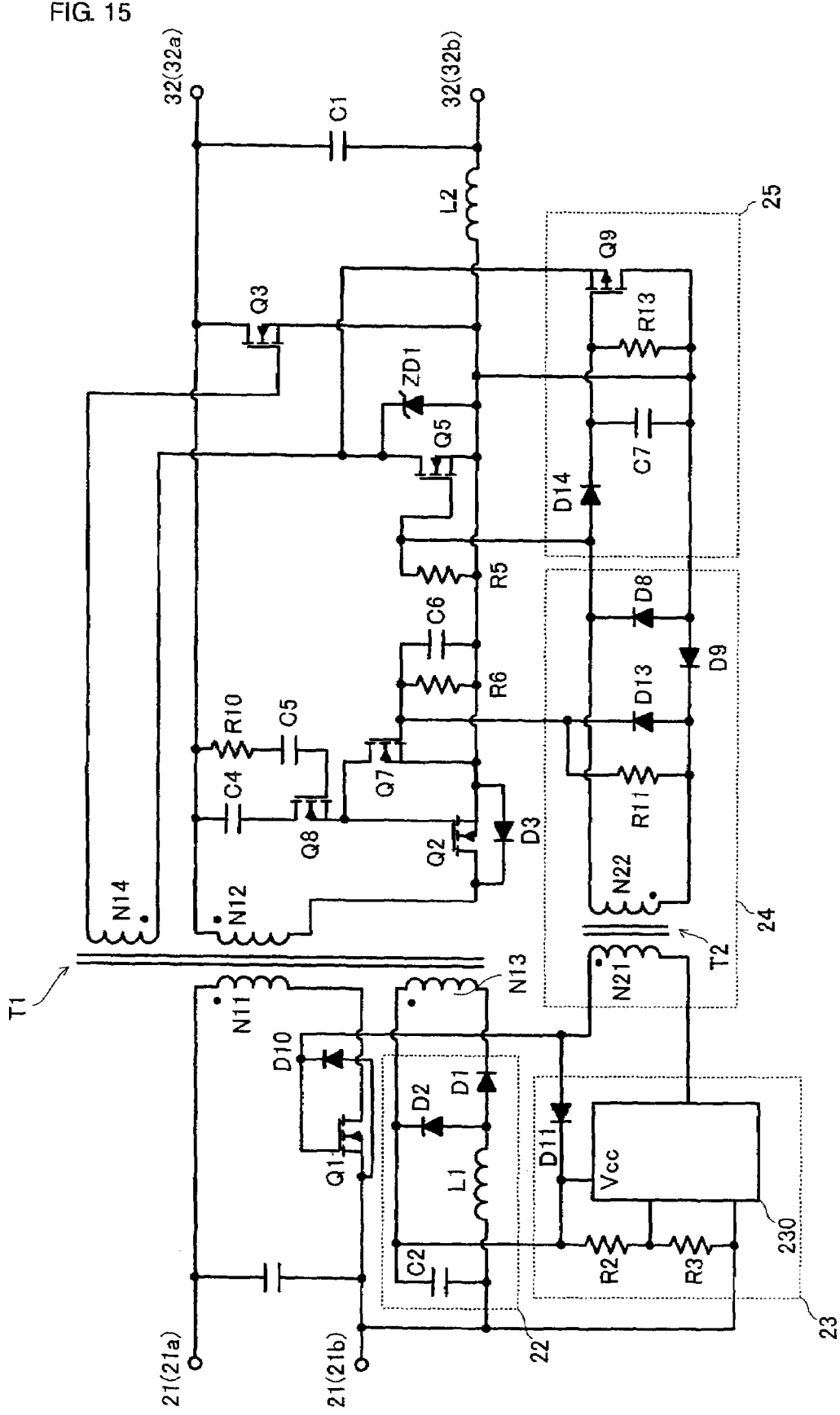
FIG. 15 is a circuit diagram of a synchronous rectification forward converter according to a ninth embodiment.

Similarly to the case of FIG. 14, the circuit illustrated in FIG. 15 is also provided with the primary side control stop detection circuit 25 that is composed of the diode D14, a capacitor C7, the resistor R13, and the commutation switch turn OFF control switch element Q9 on the secondary side of the pulse transformer T2. It should be noted that the source of Q9 is connected to the drain of Q5. When Q9 is turned ON in accordance with the stop of the control of the switching control circuit 23, Q9 is short circuited between the drain and the source of Q5. Other configurations and actions are similar to those illustrated in FIG. 12.

As the commutation switch turn OFF control switch element Q5 is short circuited at the time of the stop of the primary side control in this way, the ON period of the commutation switch element Q3 is limited to the transformer resonance cycle. Accordingly the excitation period of the choke coil L2 is limited. Thus, the decrease in the oscillation frequency at the time of the self-oscillation operation can be suppressed.

The invention claimed is:

1. A synchronous rectification forward converter, comprising:
   a transformer provided with a primary winding, a secondary winding, and a tertiary winding;
   a main switch element connected in series to the primary winding of the transformer;
   a choke coil connected in series to the secondary winding of the transformer;
   output terminals;
   a smoothing capacitor connected across the output terminals;
   a rectification switch element having main terminals and a gate terminal, one of said main terminals being connected in series to one end of the secondary winding of the transformer, the gate terminal being connected to the other end of said secondary winding by a drive current supply path for receiving a control voltage from said secondary winding, thereby turning the rectification switch element ON and OFF in synchronism with ON and OFF of the main switch element;
   a commutation switch element for being turned OFF in synchronism with ON of the main switch element and for being turned ON to form a discharge path for an excitation energy of the choke coil in synchronism with OFF of the main switch element;
   an output voltage detection circuit for indirectly detecting an output voltage between the output terminals with use of an induced voltage of the tertiary winding of the transformer;
   a switching control circuit for controlling a switching of the main switch element;
   a rectification switch control element for forcedly turning OFF the rectification switch element by controlling a voltage of a control terminal of the rectification switch element; and
   a rectification switch element driver circuit for controlling the rectification switch control element at a timing when the main switch element is turned OFF in accordance with the control of the switching control circuit.

2. The synchronous rectification forward converter according to claim 1, further comprising a commutation switch element driver circuit for forcedly turning OFF the commutation switch element in accordance with the control of the switching control circuit at a timing when the main switch element is turned ON, by controlling the voltage of a control terminal of the commutation switch element.

3. The synchronous rectification forward converter according to claim 2, wherein an AC voltage supply for the commutation switch element driver circuit is derived from a voltage generated in one of said windings of said transformer.

4. A synchronous rectification forward converter, comprising:
   a transformer provided with a primary winding, a secondary winding, and a tertiary winding:
   a main switch element connected in series to the primary winding of the transformer;
   a choke coil connected in series to the secondary winding of the transformer;
   output terminals;
   a smoothing capacitor connected across the output terminals;
   a rectification switch element connected in series to the secondary winding of the transformer, for being turned ON and OFF in synchronism with ON and OFF of the main switch element;
   a commutation switch element for being turned OFF in synchronism with ON of the main switch element and for being turned ON to form a discharge path for an excitation energy of the choke coil in synchronism with OFF of the main switch element;
   an output voltage detection circuit for indirectly detecting an output voltage between the output terminals with use of an induced voltage of the tertiary winding of the transformer;

a switching control circuit for controlling a switching of the main switch element;

a rectification switch control element for forcedly turning OFF the rectification switch element by controlling a voltage of a control terminal of the rectification switch element;

a rectification switch element driver circuit for controlling the rectification switch control element at a timing when the main switch element is turned OFF in accordance with the control of the switching control circuit;

further comprising a commutation switch element driver circuit for forcedly turning OFF the commutation switch element in accordance with the control of the switching control circuit at a timing when the main switch element is turned ON, by controlling the voltage of a control terminal of the commutation switch element;

wherein an AC voltage supply for the commutation switch element driver circuit is derived from a voltage generated in one of said windings of said transformer; and further comprising a pulse transformer for transmitting ON and OFF signals of the main switch element, and on a secondary side thereof, a diode bridge for rectifying ON and OFF signals of the main switch element and for placing an OFF timing of the rectification switch element and an OFF timing of the commutation switch element on a same signal line for transmission.

5. The synchronous rectification forward converter according to claim 4, further comprising:

first and second commutation switch turn OFF control switch elements connected in series to an auxiliary winding of the transformer, for controlling application of an electromotive voltage of the auxiliary winding of the transformer with respect to the control terminal of the commutation switch element;

a control switch element driver circuit for turning ON the first commutation switch turn OFF control switch element when the main switch element is ON; and a primary side control stop detection circuit for detecting a control stop state of the switching control circuit and for turning ON the second commutation switch turn OFF control switch element, wherein the first commutation switch turn OFF control switch element controls an OFF timing of the commutation switch element and the second commutation switch turn OFF control switch element controls an ON timing of the commutation switch element when the switching of the main switch element is stopped.

6. The synchronous rectification forward converter according to claim 4, further comprising:

a rectification switch turn ON control switch element connected in series to an ON drive electric power supply path for a control signal from one terminal of the secondary winding of the transformer to the control terminal of the rectification switch element; and a primary side control stop detection circuit for detecting a control stop state of the switching control circuit and for turning OFF the rectification switch turn ON control switch element;

wherein when the switching of the main switch element is stopped, an ON period of the rectification switch element is limited, to stop a synchronous rectification of the rectification switch element.

7. A synchronous rectification forward converter, comprising:

a transformer provided with a primary winding, a secondary winding, and a tertiary winding;

a main switch element connected in series to the primary winding of the transformer;

a choke coil connected in series to the secondary winding of the transformer;

output terminals;

a smoothing capacitor connected across the output terminals;

a rectification switch element connected in series to the secondary winding of the transformer, for being turned ON and OFF in synchronism with ON and OFF of the main switch element;

a commutation switch element for being turned OFF in synchronism with ON of the main switch element and for being turned ON to form a discharge path for an excitation energy of the choke coil in synchronism with OFF of the main switch element;

an output voltage detection circuit for indirectly detecting an output voltage between the output terminals with use of an induced voltage of the tertiary winding of the transformer;

a switching control circuit for controlling a switching of the main switch element;

a rectification switch control element for forcedly turning OFF the rectification switch element by controlling a voltage of a control terminal of the rectification switch element;

a rectification switch element driver circuit for controlling the rectification switch control element at a timing when the main switch element is turned OFF in accordance with the control of the switching control circuit;

further comprising a commutation switch element driver circuit for forcedly turning OFF the commutation switch element in accordance with the control of the switching control circuit at a timing when the main switch element is turned ON, by controlling the voltage of a control terminal of the commutation switch element;

wherein an AC voltage supply for the commutation switch element driver circuit is derived from a voltage generated in one of said windings of said transformer; and further comprising, on a primary side of a pulse transformer for transmitting ON and OFF signals of the main switch element, a diode bridge for generating ON and OFF signal of the main switch element in a same direction between the primary side and the secondary side of the pulse transformer.

8. The synchronous rectification forward converter according to claim 7, further comprising a delay circuit for separating the pulse transformer for transmitting the ON and OFF signals of the main switch element from the control signal path to the main switch element and for setting a delay time for a rise of the ON and OFF signals and the ON control signal of the main switch element.

9. The synchronous rectification forward converter according to any one of claims 1 to 3, further comprising: an additional switch element connected in series in said drive current supply path of the rectification switch element; and a switch element control circuit for turning the additional switch element ON and OFF in synchronism with ON and OFF of the main switch element.

10. The synchronous rectification forward converter according to any one of claims 1 to 3, wherein the drive current supply path includes a capacitor connected in series between said secondary winding and said gate terminal.

* * * * *